US012731911B2

(12) United States Patent
Kronfeld et al.

(10) Patent No.: US 12,731,911 B2
(45) Date of Patent: Sep. 8, 2026

(54) METHODS AND DEVICES FOR ANTENNA SHARING USING A RADIOHEAD IN A DISTRIBUTED RADIO SYSTEM

(71) Applicant: Intel Corporation, Santa Clara, CA (US)

(72) Inventors: Ronen Kronfeld, Shoham (IL); Rajesh Juluri, San Jose, CA (US); Walid El Hajj, Antibes (FR); Wilfrid D'Angelo, Mougins (FR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/893,205

(22) Filed: Aug. 23, 2022

(65) Prior Publication Data

US 2024/0072455 A1 Feb. 29, 2024

(51) Int. Cl.
*H01Q 21/28* (2006.01)
*H01Q 21/00* (2006.01)

(52) U.S. Cl.
CPC ......... *H01Q 21/28* (2013.01); *H01Q 21/0006* (2013.01)

(58) Field of Classification Search
CPC .. H01Q 21/0006; H01Q 21/28; H04B 1/0064; H04B 1/0458; H04B 1/0483; H04B 1/40
See application file for complete search history.

(56) References Cited

U.S. PATENT DOCUMENTS

| | | | |
|---|---|---|---|
| 8,958,845 B2 | 2/2015 | Alexopoulos et al. | |
| 10,224,611 B2 | 3/2019 | Hong et al. | |
| 2018/0368082 A1 | 12/2018 | O'Shea et al. | |
| 2022/0085488 A1* | 3/2022 | Irci | H01Q 1/2291 |

OTHER PUBLICATIONS

Extended European Search Report for corresponding European patent application No. 23184164.4, dated Jan. 19, 2024, 9 pages (for informational purposes only).

* cited by examiner

*Primary Examiner* — Hoang V Nguyen
(74) *Attorney, Agent, or Firm* — Viering, Jentschura & Partner mbB

(57) ABSTRACT

A combined antenna circuitry including a multi-feed antenna including a first antenna feed, a second antenna feed, and a third antenna feed; wherein the first antenna feed is configured to be connected to a first antenna of the combined antenna circuitry and is configured to operate on a first frequency band of a first radio access technology (RAT); wherein the second antenna feed is configured to be connected to a second antenna of the combined antenna circuitry and is configured to operate on a second frequency band of the first RAT; and wherein the third antenna feed is configured to be connected to the second antenna of the combined antenna circuitry and is configured to operate on a frequency band of a second RAT, wherein the frequency band of the second RAT does not correspond to any frequencies of the second frequency band of the first RAT.

20 Claims, 13 Drawing Sheets

FIG. 11

1100

| | | 1108 | | 1104 | | 1102 | | 1106 | |
|---|---|---|---|---|---|---|---|---|---|
| M.2 Antenna ID | | #0 | | #1 | | #2 | | #3 | |
| Antenna Name | | Main | | MIMO4 | | MIMO3 | | Diversity/GNSS (Aux) | |
| Primary Function | | Mode | Freq / MHz | Mode | Freq / MHz | Mode | Freq / MHz | Mode | Freq / MHz |
| Antenna Use /Freq Range | | TX/RX | 617-5925 | RX | 1427-5000 | TX/RX | 1427-5000 | RX | 617-5925 |
| Frequency bands groups (MHz) | LB | TX/RX | 617~960 | | | | | RX | 617~960 |
| | LMB | RX | 1427~1517 | | 1427-1517 | | 1427-1496 | RX | 1427~1517 |
| | GNSS L1 | | | | | | | RX | 1559~1606 |
| | MB | TX/RX | 1710~2200 | RX | 1805-2200 | TX/RX | 1710~2200 | RX | 1805-2200 |
| | HB | TX/RX | 2300~2690 | RX | 2300-2690 | TX/RX | 2300~2690 | RX | 2300-2690 |
| | UHB | TX/RX | 3300~4200 | RX | 3300~4200 | TX/RX | 3300~4200 | RX | 3300~4200 |
| | n79 | TX/RX | 4400~5000 | RX | 4400-5000 | TX/RX | 4400~5000 | RX | 4400~5000 |
| | LAA | RX | 5150~5925 | | | | | RX | 5150~5925 |

METHODS AND DEVICES FOR ANTENNA SHARING USING A RADIOHEAD IN A DISTRIBUTED RADIO SYSTEM

TECHNICAL FIELD

This disclosure may generally relate to the field of wireless communications.

BACKGROUND

As the number of radio technologies and antennas increase in wireless communication devices, it becomes more difficult to ensure regulatory compliance. Additionally, as the form factor of wireless communication devices becomes smaller, mechanical constraints may be required to meet regulations. The smaller form factor may also require restrict radio transmission power, which may impact device performance. In order to accommodate multiple radio technologies, it may be beneficial to share antennas between different radio access technologies (RATs). For example, wireless wide area network (WWAN) and wireless fidelity (Wi-Fi) communication may share a single antenna of a wireless communication device. RAT modules may support regulatory certification for different RATs. This may allow the reduction of antennas and mechanical constraints while maintaining the same certifications of Wi-Fi and WWAN modules.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, the disclosure may be described with reference to the following drawings, in which:

FIG. 11 shows an exemplary table of frequency bands of a RAT in a wireless communication device;

DETAILED DESCRIPTION

In the following detailed description, numerous specific details are set forth in order to provide a thorough understanding of some examples. However, it will be understood by persons of ordinary skill in the art that some examples may be practiced without these specific details. In other instances, well-known methods, procedures, components, units and/or circuits have not been described in detail so as not to obscure the discussion.

Some multi-radio wireless communication devices may use separate antennas for different RATs. For example, a dedicated antenna for Wi-Fi and a dedicated antenna for WWAN. Sharing a single antenna between WWAN communication and Wi-Fi and/or Bluetooth communication may be beneficial in a crowded multi-radio wireless communication device. Because each RAT may support multiple frequency bands using multiplexers placed in its respective module, a single cable may be connected between the multiplexer in the module and the corresponding antenna.

For example, Wi-Fi and Bluetooth communication may only support 3 frequency bands, namely 2.4 GHz band (2400-2483.5 MHz), 5 GHz band (5150-5895 MHz), and 6 GHz band (5925-7125 MHz), where the 5 GHz and 6 GHz bands could be regarded a single 5-7 GHz band (5150-7125 MHz).

Sharing a single antenna between WWAN and Wi-Fi and/or Bluetooth modules may be accomplished by separately connecting the 2.4 GHz and the 5-7 GHz bands from the Wi-Fi and/or Bluetooth module to an antenna shared with a WWAN module. The demultiplexed WWAN bands may be multiplexed with the Wi-Fi and/or Bluetooth 2.4 GHz and 5-7 GHz bands on the antenna side. This may require twice as many coaxial cables as previous configurations. For example, coaxial cables may connect the Wi-Fi and/or Bluetooth module to the shared antenna. It should be noted that other connections between the Wi-Fi or Bluetooth modules are possible. This may increase the cost and size of a device and introduce loss between the WWAN Module and the antenna, which will degrade the devices performance.

Alternatively, both WWAN and Wi-Fi/Bluetooth may be implemented in the same module to enable multiplexing WWAN bands with Wi-Fi/Bluetooth bands and connect them to a single shared antenna. However, this is not a practical/feasible solution, due to module size constraints, and other limitations, e.g., aggregated power consumption and power dissipation in the Module during concurrent operation. It would be desirable to maintain separate WWAN and Wi-Fi/Bluetooth modules for a shared antenna while not degrading performance of a multi-radio wireless communication.

Figure 1A:
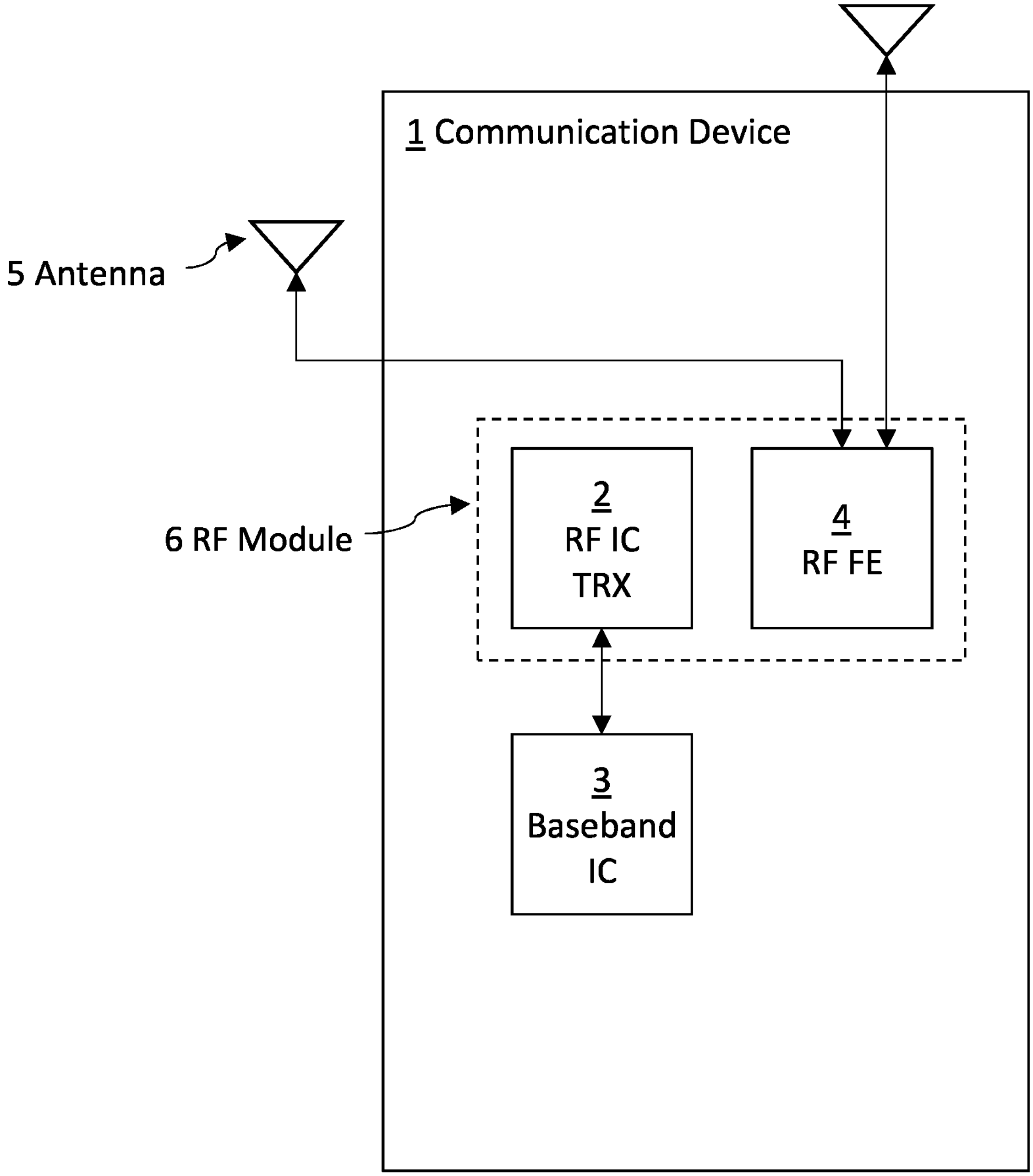
FIG. 1A shows a block diagram of a wireless communication device including a RF module.

FIG. 1A shows a block diagram of a wireless communication device including a conventional wireless communication system. Referring to FIG. 1A, the wireless communication device 1 includes a baseband integrated circuit 3 for baseband signal processing, a centralized RF module 6 for radio frequency signal processing, and one or more discrete antennas 5. The RF module 6 and antennas 5 are separate modules that are connected using a specialized radio frequency (RF) cable, e.g., coax cable, as a feed line to communicate RF electrical signals between the RF module and the antennas. Typically, as high-performance mini coax cables are costly components, only a single mini coax cable to each antenna is used due to cost and space constraints. Moreover, the RF electrical signals still suffer impedance mismatches and accumulated insertion losses even on a high performance specialized RF cable depending on the cable length.

The RF module 6 may include an RF integrated circuit (IC) 2 including one or more RF transceivers (TRX) and a common RF front end (FE) 4. The RF IC 2 may receive one or more data and control signals and operate to receive a communication signal from the baseband IC and generate an RF electrical signal from the communication signal for radio transmission from the device 1 or receive an RF electrical signal and generate a communication signal from the RF electrical signal for providing to the baseband IC. The RF FE 4 may convert an RF electrical signal into a format for transmission via the antenna(s) 5 and/or convert a signal received from the antenna(s) 5 into an RF electrical signal for the RF IC.

As the number of antenna elements in a communication device increases, a RF module may include more co-located RF transceivers. However, the use of co-located RF transceivers and RF transceiver chains based on a conventional centralized RF module and antennas may present technical inefficiencies, disadvantages and/or technical problems and pose limitations on overall system performance and capabilities that are difficult to overcome.

For example, co-located RF transceivers can cause cross interference problems which may introduce design or physical constraints limiting integration. These size or physical constraints also reduce scalability potential, e.g., increase in transceiver chain footprint which limits the overall radiohead performance and increases cost.

For another example, using a conventional RF coax cable to connect antennas to a RF module may result in a cable loss, e.g., in excess of 2 dB at 60 cm. The cable size and cable loss may limit system performance and/or antenna placement, and/or may increase system cost. Moreover, the cable loss may limit smart antenna applications, for example, Voltage Standing Wave Ratio (VSWR) correction and/or the like. Accordingly, various technical limitations including cross interference, power consumption limitations, thermal limitations, fanout, and/or RF circuit complexity need to be overcome to efficiently to realize the integration of co-located RF transceiver chains.

Further, as the RF module and antennas are provided in different packages and may be positioned rather far away from each other, packaging and connection parasitics may have deleterious effects on the electrical designs of integrated circuits for radio frequencies. As a result, additional processing is needed to mitigate the signal degradations, thereby further increasing costs.

Further, certain combinations of RF modules and antennas may be incompatible or difficult to combine. For example, RF components and antenna components may interfere with each other.

Accordingly, advanced digital Complementary Metal-Oxide-Semiconductor (CMOS) processes or different circuit layout design and arrangement may be needed to facilitate increasing numbers of RF transceiver chains.

The present disclosure describes a low-cost, low-power, compact RF transceiver arrangement with increased silicon integration while avoiding or overcoming the various technical limitations associated with integrating co-located transceiver chains and integrating co-locating RF circuitry and antenna circuitry. For example, in some examples, a System-in-Packages (SIP) approach is used where two or more different dies are placed into a common package either side-by-side or stacked on top of each other. By combining dies of different technology and functionalities (e.g., RF, analog, digital) into one package, SIP provides substantial performance benefits, including, eliminating or reducing packaging parasitics. For another example, the present disclosure describes facilitating the placement of RF components co-located with or near an antenna while still providing optimized system performance.

The present disclosure relates to a radiohead for a distributed radio system, where at least a portion of the radiohead is co-located with an antenna. For example, the radiohead RF circuitry and antenna circuitry may be coupled to each other within a common enclosure. For another example, the antenna may be integrated with the silicon into a compact radiohead package. That is, the radiohead RF circuitry and antenna circuitry may be formed on separate silicon dies/boards that are positioned near each other. The radiohead RF circuitry and antenna circuitry may be coupled to each other within a common module or system package. The present disclosure describes various ways of integrating the antenna and at least a portion of the radiohead. The present disclosure describes interconnection structures and partitioning arrangements to simplify manufacturing, reduce manufacturing costs, improve transmission and reception quality, and/or improve energy efficiency. For example, each of these improvements derived from co-locating the RF circuitry and the antenna circuitry can incrementally reduce manufacturing cost by $0.5-$1.5/improvement (depending on SISO vs MIMO etc.)(eliminating lengthy specialized RF cables), improve key performance indicators (KPIs), and enable new use cases and experiences in wireless communication that are impossible to realize without a distributed radio system. The improvements to KPIs include eliminating insertion loss of 2-4 dB to providing higher power/range, better reception sensitivity, and/or reduced current for improved battery life.

In a distributed radiohead arrangement of the present disclosure, the transceiver chain may be divided into a time-domain processing physical (TD PHY) portion and a frequency-domain processing physical (FD PHY) portion. The TD PHY portion is co-located with one or more antennas. The TD PHY portion and the one or more antennas may be integrated. The TD PHY portion and the FD PHY portion may be separate and remotely located. The TD PHY portion and the FD PHY portion are connected to each other through a digital interface, e.g., a STEP interface, to communicate digitized baseband RF signals. The STEP interface may be an optical or electrical signal interface.

The TD PHY portion may contain the radiohead RF circuitry, the analog-to-digital/digital-to-analog (AD/DA) converters, the up/down converters, and line conditioning or impedance matching circuitry. The TD PHY portion includes an optical/electrical interface circuitry. The TD PHY portion may also have circuitry for operation and management processing capabilities.

The TD PHY portion may include a transmitter chain that is configured to convert a digital baseband RF signal to an RF electrical signal and amplify the RF electrical signal to the desired power level for radiation. The TD PHY portion may include a receiver chain that is configured to receive the desired band of an induced RF electrical signal from an antenna and amplify the RF electrical signal and convert it into a digital baseband RF signal.

In some devices, there may be multiple TD PHY portions. Each TD PHY portion may be connected to a respective FD PHY portion. Alternatively, one or more TD PHY portions may be connected to an FD PHY portion.

A distributed radiohead system may be implemented for various wireless communication systems, including Wi-Fi, Bluetooth, and cellular communication systems.

Figure 1B:
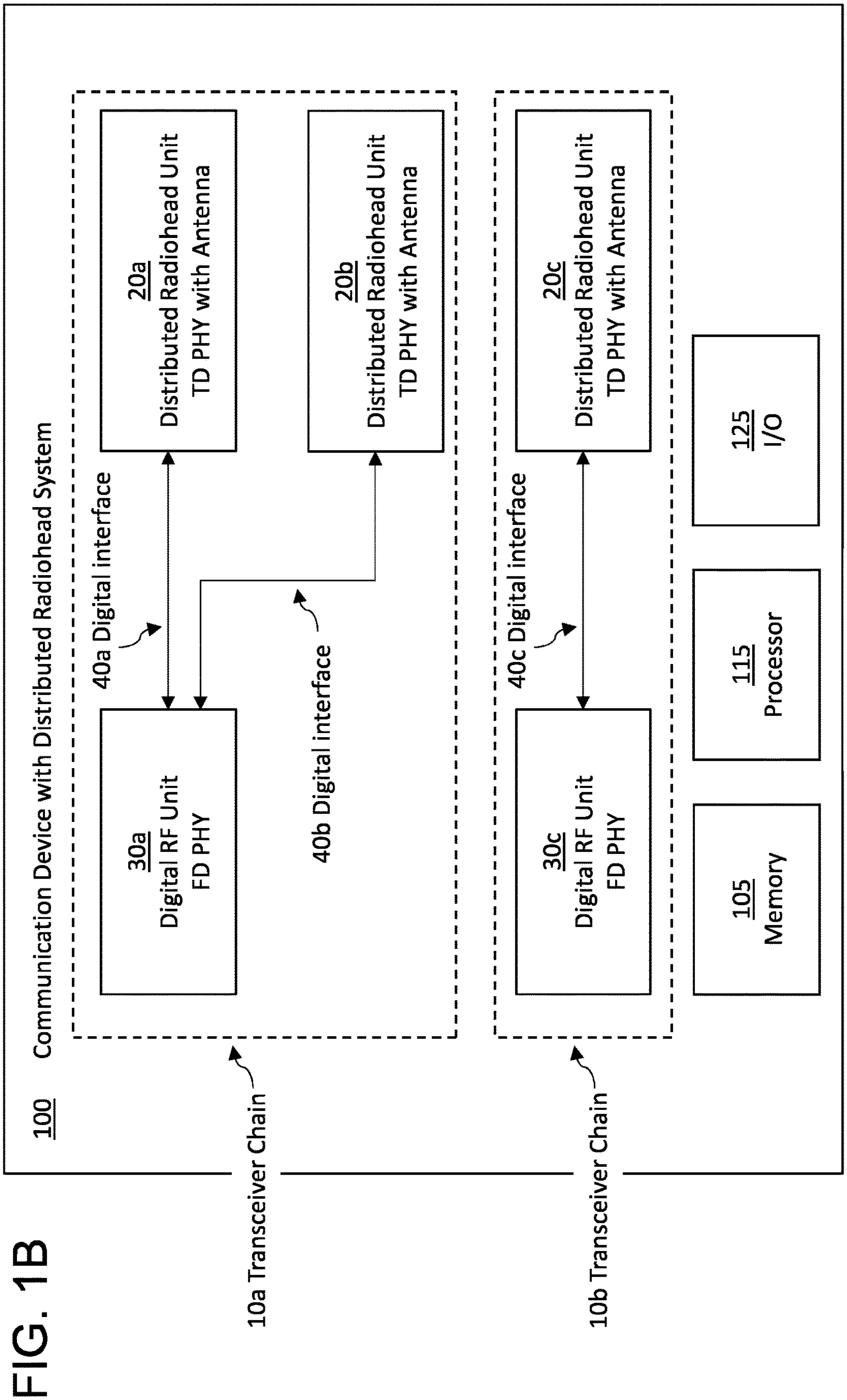
FIG. 1B shows a block diagram of a wireless communication device including a distributed radio system.

FIG. 1B illustrates a block diagram of wireless communication device 100 including a distributed radiohead system. Device 100 may be capable of communicating content, data, information and/or signals via a wireless medium or air interface. A wireless medium or air interface may include, for example, a radio channel, a cellular channel, a Global Navigation Satellite System (GNSS) channel, an RF channel, a Wi-Fi channel, an IR channel, and the like.

Referring to FIG. 1B, device 100 may include two transceiver chains 10*a*, 10*b*. Each transceiver chain 10 may include a digital RF unit (e.g. a digital RF circuit) 30 coupled to one or more distributed radiohead circuitries 20. For example, a first transceiver chain 10*a* may include a first digital RF unit (e.g. a first digital RF circuit) 30*a* including an FD PHY portion of the first transceiver chain 10*a* and two distributed radiohead circuitries 20*a*, 20*b* each including a TD PHY portion of the first transceiver chain 10*a*. Digital RF unit 30*a* is coupled to distributed radiohead circuitries 20*a*, 20*b* via digital interfaces 40*a*, 40*b*, respectively. A second transceiver chain 10*b* may include a second digital RF unit (e.g. a second digital RF circuit) 30*c* coupled to distributed radiohead circuitry 20*c* via digital interface 40*c*. The digital RF units 30 and the distributed radiohead circuitries 20 may be separately and remotely located. Each distributed radiohead unit (e.g. a distributed radiohead circuitry) 20 is co-located with one or more antennas.

Distributed radiohead circuitry 20 may be a multiband radiohead configured for concurrent operation over a plurality of wireless communication frequency bands. For example, distributed radiohead circuitry 20 may be configured to communicate over a first frequency band, e.g., the 2.4 GHz band, and to communicate over a second frequency band, e.g., the 5 GHz and/or 6-7 GHz bands.

The antenna co-located with the distributed radiohead circuitry 20 may include any type of antennas suitable for transmitting and/or receiving wireless communication signals, blocks, frames, transmission streams, packets, messages and/or data. For example, the antenna may include any suitable configuration, structure and/or arrangement of one or more antenna elements, components, units, assemblies and/or arrays. In some examples, the antenna may implement transmit and receive functionalities using common, separate, or integrated transmit and receive antenna elements.

Distributed radiohead circuitry 20 may be a standalone unit. For example, distributed radiohead circuitry may be pre-certified by a regulatory authority, as a stand-alone unit, even before being included or implemented as part of device 100. The distributed radiohead circuitry 20 may be an RF integrated circuit (IC) chip with an integrated antenna. In some examples, the RF IC may include an RF transceiver chain, a PHY TD processor, and a digital interface. A modular design of the distributed radiohead circuitry provides design flexibility. For example, distributed radiohead circuitries with different characteristics may be easily incorporated or interchanged. For another example, multiple distributed radiohead circuitries 20 may be easily disposed at different positions of a device 100 to provide improved antenna coverage.

Referring to FIG. 1B, digital RF units 30*a*, 30*c* may be configured to individually process each digital RF baseband signal. Alternatively, digital RF units 30*a*, 30*c* may be configured to collectively process the digital RF baseband signals over the plurality of distributed radiohead circuitries 20*a*, 20*b*, 20*c*.

Digital RF unit 30 may include a message processor configured to generate, process and/or access one or more messages for communication by device 100. In one example, the message processor may include at least one first component configured to generate a message, for example, in the form of a frame, field, information element and/or protocol data unit, for example, a MAC Protocol Data Unit (MPDU); and/or at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message.

In some examples, digital RF unit 30 may be a may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic. For example, digital RF unit 30 may be implemented as or included in a System-on-Chip (SoC) package.

A distributed radiohead system arrangement as shown in FIG. 1B may provide improved KPIs, for example, lower noise figure (NF), e.g., improved RX sensitivity, higher Tx power out, reduced power consumption, e.g., due to close proximity of antenna and RF, which may reduce the loss of the feed line from antenna to active components.

For example, to reduce cross talk and interference, each distributed radiohead circuitry may be formed on a different die. This also results in reduced thermal density. The arrangement also facilitates the integration of "smart" antenna applications due to the proximity of the RF circuit and the antenna.

Two or more devices 100 may be configured to communicate with each other through a wireless medium. For example, device 100 may include, operate as, and/or perform the functionality of one or more WLAN STAs, including access point (AP) STAs or non-AP STAs. A WLAN STA may include a logical entity that is a singly addressable instance of a medium access control (MAC) and physical layer (PHY) interface to the wireless medium (WM). The STA may perform any other additional or alternative functionality. Alternatively, device 100 may include, operate as, and/or perform the functionality of a multi antenna Bluetooth station.

In some examples, device 100 may include a distributed radiohead system configured to operate in a 2.4 GHz frequency band, and/or one or more other wireless communication frequency bands, for example, a 5 GHz frequency band, a 6-7 GHz frequency band, a millimeter Wave (mmWave) frequency band, e.g., a 60 GHz frequency band, a Sub-1 GHz (S1G) band, and/or any other frequency band.

In some examples, a distributed radiohead circuitry may provide a highly flexible and/or scalable solution. In some examples, device 100 may support using a same distributed radiohead circuitry for or as part of different configurations, e.g. 1×1, 2×2, 3×3 configurations, and the like. A distributed radiohead circuitry may correspond to an antenna element of a group or array of antenna elements configured to facilitate beamforming in accordance with a particular phase and amplitude taper (or other distribution). In some examples, device 100 may support and/or integrate multi-standard distributed radiohead circuitries, which may be implemented to support multiple communication standards, e.g. LTE, Wi-Fi, and the like. In another example, device 100 may support use of a same distributed radiohead circuitry 20 for multiple applications, e.g., ranging from cellphone, laptop, AP, IOT and/or the like. In another example, device 100 may support flexible transceiver and/or antenna location, for example, digital interface 40 may be a cable extending several meters in length with low power/performance impact, which may be applicable to large systems, e.g., industrial robots and the like.

Referring again to FIG. 1B, device 100 may include, for example, one or more processors 115, an input/output interface 125, and memory 105. Device 100 may optionally include other suitable hardware components and/or software components. In some examples, some or all of the components of device 100 may be enclosed in a common housing or packaging, and may be interconnected or operably associated using one or more wired or wireless links. Components of device 102 may be distributed among multiple or separate devices.

In some examples, processor(s) 115 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor(s) 115 executes instructions, for example, of an Operating System (OS) of device 100 and/or of one or more suitable applications.

In some examples, memory 105 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable storage units including, for example, a hard disk drive, a floppy disk drive, a Solid State Drive (SSD), a Compact Disk (CD) drive, a CD-ROM drive, a DVD drive, or other suitable removable or non-removable storage units. Memory 105, for example, may store instructions for operating device 100 and/or data processed by device 100.

Figure 2:
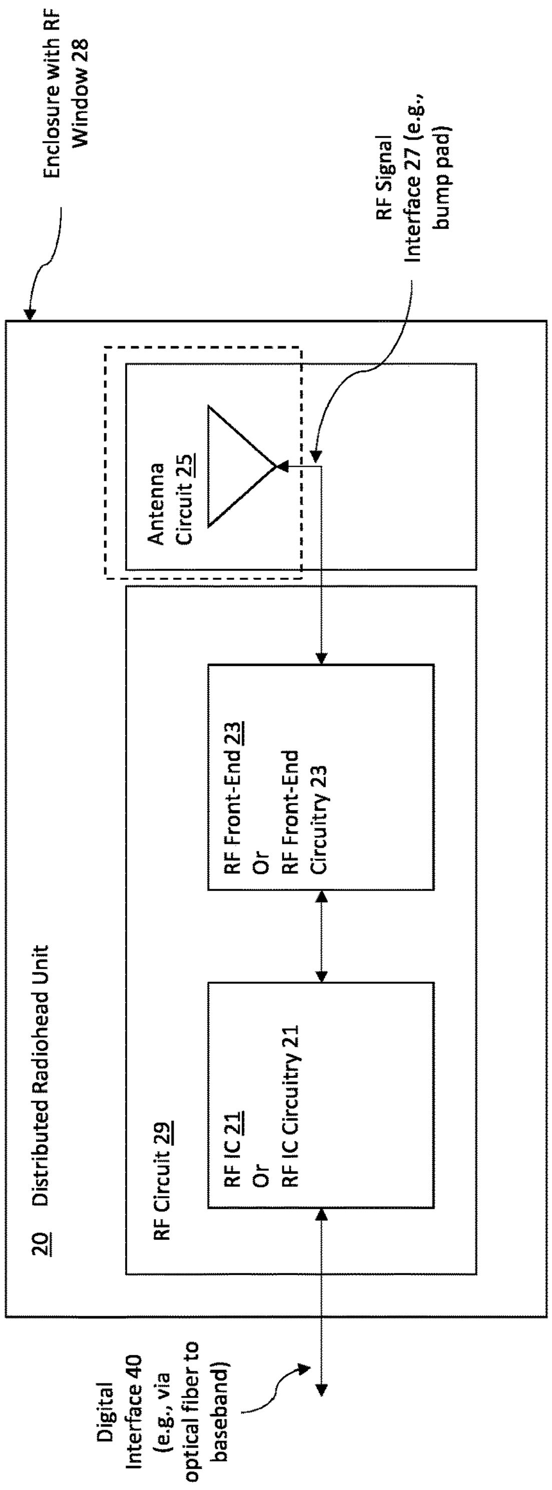
FIG. 2 shows a block diagram of a distributed radiohead circuitry.

FIG. 2 illustrates a block diagram of a distributed radiohead circuitry 20. The distributed radiohead circuitry 20 includes an RF circuit 29 and antenna circuit 25 that are co-located. By co-locating the RF circuit 29 and antenna circuit 25, a specialized RF cable is not needed. Referring to FIG. 2, the RF circuit 29 and antenna circuit 25 may be connected via an RF electrical signal interface 27 at a silicon die or circuit board level. The various RF electrical interfaces 27 that will be described herein will provide reduced manufacturing costs, improved communication performance, and compact design.

Further, the RF electrical signal interfaces 27 as described herein also facilities a modular antenna circuit design. For example, the RF circuit 29 may be formed on one silicon die or circuit board and the antenna circuit 25 may be formed on another silicon die or circuit board. As the RF electrical interface 27 may be predefined, a custom antenna circuit or an antenna circuit from another vendor may be easily incorporated or interchanged into the distributed radiohead circuitry 20.

In some examples, the RF circuit 29 and antenna circuit 25 may be further integrated into a single enclosure or package. This may further provide improved performance by reducing interference between the RF circuit 29 and the antenna circuit 25.

Referring to FIG. 2, RF circuit 29 may include an RF integrated circuit (IC) or RF IC circuitry 21 and a RF front-end (FE) or RF FE circuitry 23. RF IC circuitry 21 may include an RF transceiver having one or more RF transmission chains. The RF FE circuitry 23 may include band pass filters, amplifiers, matching network.

In some examples, the RF IC 21 may be implemented on a separate die as a System-in-a-Package (SIP) mounted on a radiohead PCB (not shown) and RF FE circuitry 23 and circuitry for a digital interface 40 may also be mounted on the same radiohead PCB module. An antenna circuit 25 may be provided on a separate antenna PCB (not shown). The radiohead PCB and antenna PCB may each include circuitry for the RF electrical interface 27 for coupling to each other.

The example distributed radiohead circuitry 20 is provided for ease of explanation, and may include additional, less, or alternate components as those shown in FIG. 2.

Figure 3:
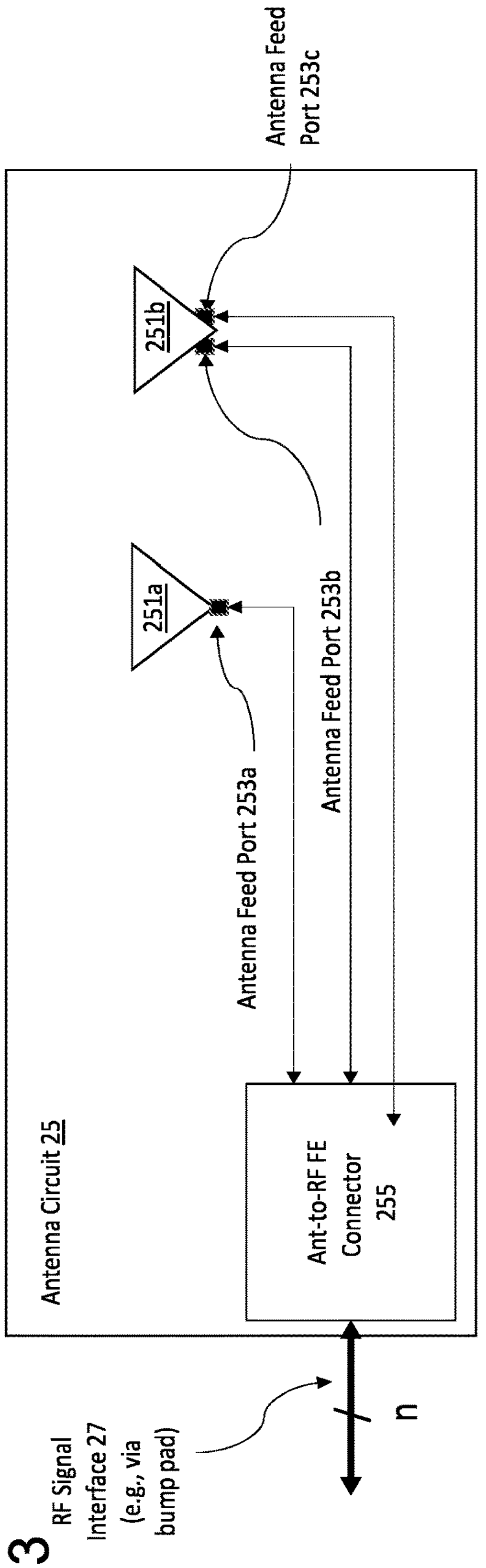
FIG. 3 shows a block diagram of an antenna circuit of a distributed radiohead circuitry.

FIG. 3 illustrates a block diagram of antenna circuit 25. An antenna circuit 25 may include one or more antennas 251. An antenna may include one or more feed ports 253. For example, referring to FIG. 3, antenna circuit 25 may include two antennas 251*a* and 251*b*, where a first antenna 251*a* includes a single antenna feed port 253*a* and a second antenna includes two antenna feed ports 253*b* and 253*c*. Each of the antenna feed ports may be associated with a different frequency band. Each of the antenna feed ports may be electrically connected to an antenna-to-RF FE connector 255 for the RF signal interface 27. The RF signal interface 27 may provide a plurality of separate electrical signal lines, each corresponding to a respective one of the antenna feed ports allowing signals of different frequency bands to be communicated to RF circuit 25 without using combiners and splitters typical of conventional RF modules which have only one coaxial cable connection to the antenna. The connector 255 also provides design flexibility by facilitating connections to various antenna designs (i.e., modular antenna circuits).

Figure 4:
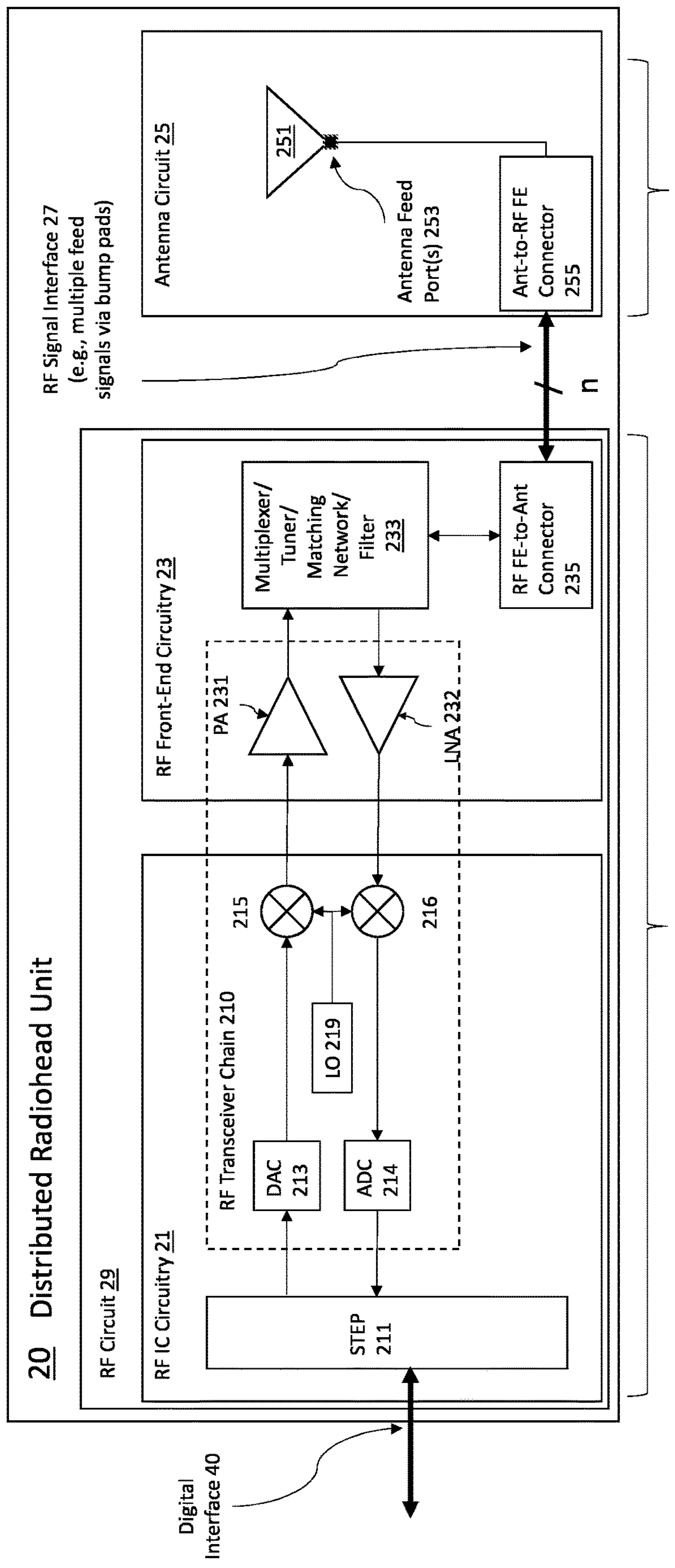
FIG. 4 shows a more detailed block diagram of the distributed radiohead circuitry of FIG. 2.

FIG. 4 illustrates a more detailed block diagram of the distributed radiohead circuitry of FIG. 2. Referring to FIG. 4, RF circuit 29 may include one or more RF transceiver chains 210 configured to perform time-domain processing of the RF electrical signals. Each RF transceiver chain 210 may include a transmit chain and a receive chain. A transmit chain may be configured to convert a digitized baseband signal for RF transmission. A transmit chain may include a digital-to-analog converter (DAC) 213, a mixer 215 for up-converting, and a power amplifier (PA) 231, and a passive element circuit 233 such as a multiplexer, tuner, matching network, and/or filter. A receive chain may be configured to convert received RF energy into a digitized baseband signal. A receive chain may include a passive element circuit 233, a low noise amplifier (LNA) 232, a mixer 216 for down-converting, an analog-to-digital converter (ADC) 214. The RF transceiver chain 210 may include a local oscillator (LO) 219 configured to distribute timing signals to one or more radio chains, e.g., a transmit chain and/or a receive chain. This example is not limiting. The RF circuit 29 may include more or less components. For example, the RF circuit 29 may also include a low pass filter (LPF) on the transmit chain and adjusted gain control (AGC) on the receive chain. The RF circuit 29 may also include a STEP interface 211. The STEP interface 211 is a digital interface configured to communicate digital RF baseband signal to a digital RF unit configured to perform frequency-domain processing of the digital RF baseband signal. A physical link of the STEP interface 211 may be electrical or optical.

An RF circuit 29 may be implemented on a single silicon die or circuit board or on a plurality of silicon dies or circuit boards. Referring again to FIG. 4, an RF circuit 29 may be provided on two silicon dies or circuit boards, where a portion of RF transceiver chain 210 is provided in RF IC circuitry 21 and another portion of RF transceiver chain 210 is provided in RF FE circuitry 23. For example, RF IC circuitry 21 may include DAC 213, ADC 214, mixers 215, 216, and LO 219 and RF FE circuitry 23 may include amplifiers PA 231, LNA 232. Alternatively, RF transceiver chain 210 may be included only in RF IC circuitry 21.

In the example RF FE circuitry 23, as shown, one or more antenna feed signals (e.g., n>=1) may be communicated from/to RF FE circuitry 23 at connector 235 to/from antenna circuit 25. The RF FE circuitry 23 may include a passive element 233 such as for example multiplexer or matching network for adjusting the line impedance of each respective antenna feed signal transmitted and/or received. The RF FE circuitry 23 may also include PA and LNA amplifiers for each respective antenna feed signal.

Referring again to FIG. 4, RF circuit 23 may receive an RF Rx signal via antenna circuit 25. The RF circuit 29 may include or be a PHY TD processor implemented as or include an RF IC circuit 21 and an RF FE circuit 23. The RF circuit 29 may generate a digital PHY TD Rx signal (e.g., a digital RF baseband signal) based on the RF Rx signal. The STEP interface 211 may communicate the digital PHY TD Rx signal from the distributed radiohead circuitry 20 to digital RF unit 30 via digital interface 40. Reciprocally, the distributed radiohead circuitry 20 may receive a digital PHY TD Tx signal from digital RF unit 30 via digital interface 40. RF circuit 29 may generate an RF Tx signal based on the digital PHY TD Tx signal.

Figure 5:
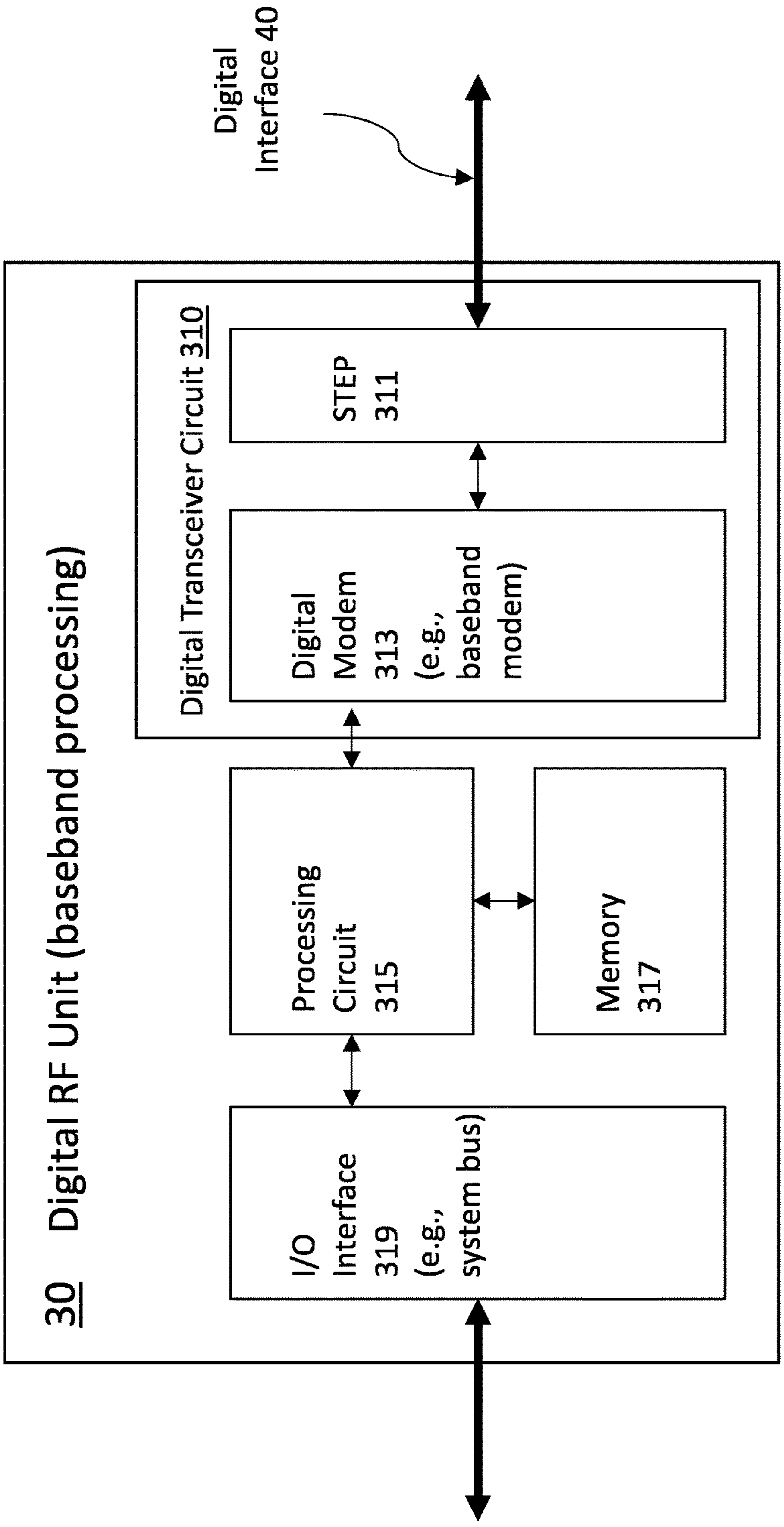
FIG. 5 shows a block diagram of a digital RF circuit.

FIG. 5 is a block diagram of a digital RF unit (e.g. digital RF circuit) 30. As shown in FIG. 5, a digital RF unit 30 may include a digital transceiver circuit 310 including a digital RF baseband signal interface 311 (e.g., a STEP interface) and digital baseband modem 313. A digital RF unit 30 may also include a processing circuit 315 (e.g., one or more processors), a memory 317, and an input/output interface 319 (e.g., a system bus). A digital RF unit 30 may be connected to one or more distributed radiohead circuitries 20 depending on processing capabilities. A digital RF unit 30 may be coupled to a distributed radiohead circuitry 20 via digital interface 40 or any suitable type of communication link that facilitates digital communications between these components. For example, a digital interface 40 may be implemented using an optical fiber cable. As another example, the digital interface 40 may be implemented using a flexible flat cable (FFC), flexible printed circuit (FPC) cable, etc. Alternatively, the digital interface 40 may be implemented as any suitable type of wired or wireless interconnection, such as cabling, for example, configured to carry bidirectional communication of digital baseband signal data in accordance with one or more suitable communication protocols.

For instance, this section is not limited to the particular distributed radiohead system, units, or layouts as shown in FIG. 1 to FIG. 5. In other words, the device 100 including a distributed radiohead system as shown in FIG. 2 may have various configurations, with different or alternative components being coupled to or associated with individual dies or chips. To provide an illustrative example, the antenna circuit 25 may include additional components depending upon the particular mode of operation and/or design, including, for example, multiple or arrays of radiating elements or multiple feed ports. For another example, the antenna may be a phased array including one or more phase shifters formed in the silicon.

Figure 6:
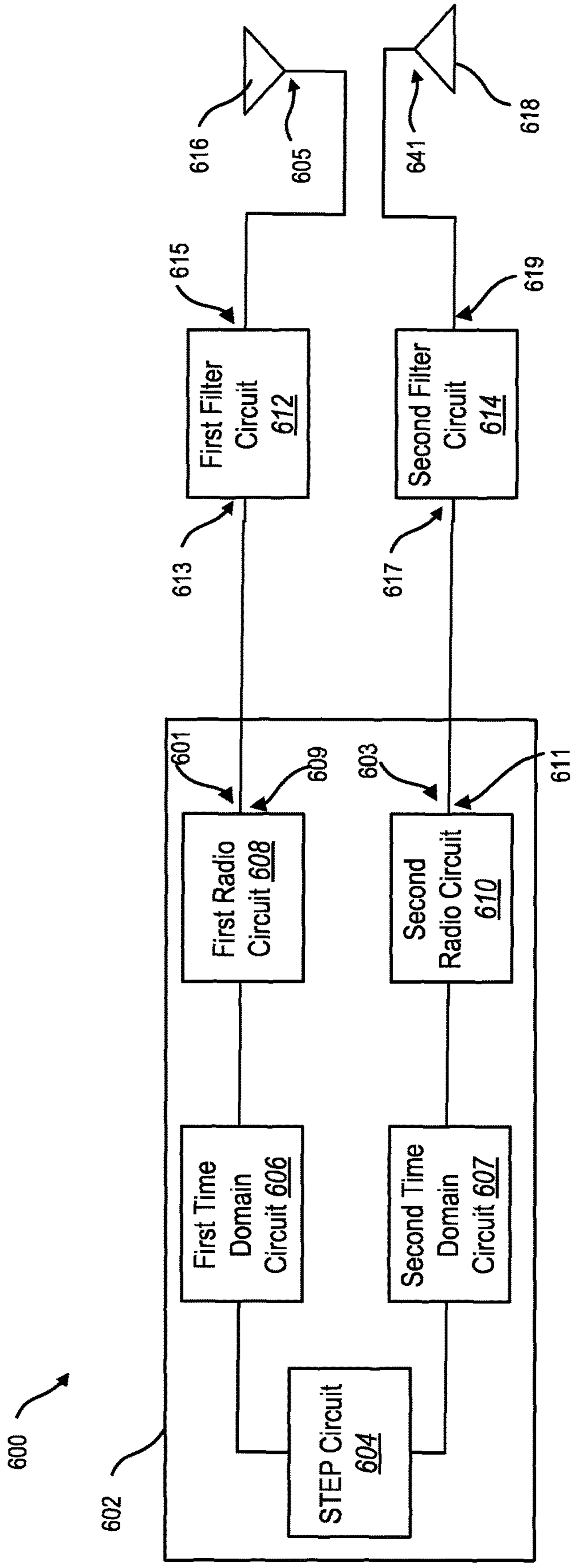
FIG. 6 shows a block diagram of an example multi-radio device.

FIG. 6 illustrates a block diagram of an example multi-radio device 600. The multi-radio device 600 may be the same as or similar to communication device 100, described above in relation to FIG. 1B. The multi-radio device 600 may include radiohead circuitry 602, a first filter circuit 612, a second filter circuit 614, a first antenna circuit 616, and a second antenna circuit 618. The radiohead circuitry 602 may include a STEP circuit 604, a first time domain circuit 606, a second time domain circuit 607, a first radio circuit 608, and a second radio circuit 610.

The radiohead circuitry 602 may be the same as or similar to other radiohead circuitries described in the present disclosure (e.g., distributed radiohead unit 20). The first antenna circuit 616 and the second antenna circuit 618 may be the same as or similar to other antenna circuits described in the present disclosure (e.g., antenna circuit 25).

The STEP circuit 604 may be electrically coupled to the first time domain circuit 606 and the second time domain circuit 607. The first time domain circuit 606 may be electrically coupled to the first radio circuit 608. The second time domain circuit 607 may be electrically coupled to the second radio circuit 610.

The first radio circuit 608 may include a first terminal 601 and a fifth terminal 609. The second radio circuit 610 may include a second terminal 603 and a sixth terminal 611. The first antenna circuit 616 may include a third terminal 605 and the second antenna circuit 618 may include a fourth terminal 607. The first filter circuit 612 may include a seventh terminal 613 and an eighth terminal 615. The second filter circuit 614 may include a ninth terminal 617 and a tenth terminal 619.

The first terminal 601 may be electrically coupled to the seventh terminal 613. In addition, the seventh terminal 613 may be electrically coupled to the fifth terminal 609. The second terminal 603 may be electrically coupled to the ninth terminal 617. In addition, the ninth terminal 617 may be electrically coupled to the sixth terminal 611. The eighth terminal 615 may be electrically coupled to the third terminal 605. In addition, the tenth terminal 619 may be electrically coupled to the fourth terminal 607.

The STEP circuit 604 may include a serial interface that is communicatively coupled to additional electronic devices (e.g., a SOC) (not illustrated in FIG. 6). For example, the STEP circuit 604 may be communicatively coupled to a Wi-Fi digital signal processor (DSP) of the SOC. The STEP circuit 604 may generate a first STEP signal and a second STEP signal. The STEP circuit 604 may receive signals from the SOC in a first time domain, a second time domain, or some combination thereof. The STEP circuit 604 may generate the first STEP signal and the second STEP signal in the first time domain, the second time domain, or some combination thereof. The first time domain circuit 606 may generate a first time domain signal based on the first STEP signal. The first time domain circuit 606 may generate the first time domain signal by manipulating the first STEP signal in the corresponding time domain. The second time domain circuit 607 may generate a second time domain signal based on the second STEP signal. The second time domain circuit 607 may generate the second time domain signal by manipulating the second STEP signal in the corresponding time domain.

The first radio circuit 608 may provide a first radio signal within a first frequency range based on the first time domain signal. In addition, the second radio circuit 610 may provide at least one of a second radio signal within a second frequency range and a third radio signal within a third frequency range based on the second time domain signal. Each of the first frequency range, the second frequency range, and the third frequency range may include different frequency ranges.

The first filter circuit 612 may receive and filter out portions of the first radio signal that are outside the first frequency range. The second filter circuit 614 may receive and filter out portions of the second radio signal that are outside the second frequency range. In addition, the second filter circuit 614 may receive and filter out portions of the third radio signal that are outside of the third frequency range.

The first antenna circuit 616 may receive the first radio signal. In addition, the first antenna circuit 616 may transmit a first wireless signal within the first frequency range representative of the first radio signal. The second antenna circuit 618 may receive the second radio signal and the third radio signal. In addition, the second antenna circuit 618 may transmit a second wireless signal representative of at least one of the second radio signal and the third radio signal. The second antenna circuit 618 may transmit the second wireless signal concurrent with the first antenna circuit 616 transmitting the first wireless signal. The second antenna circuit 618 may transmit the second wireless signal within the second frequency range if the second wireless signal is representative of the second radio signal. Alternatively, the second antenna circuit 618 may transmit the second wireless signal within the third frequency range if the second wireless signal is representative of the third radio signal.

The first antenna circuit 616 may provide a first receive radio signal within the first frequency range to the first radio circuit 608. The first antenna circuit 616 may provide the first receive radio signal to the first radio circuit 608 via the first filter circuit 612 and the fifth terminal 609. The second antenna circuit 618 may provide a second receive radio signal within the second frequency range or the third frequency range to the second radio circuit 610. The second antenna circuit 618 may provide the second receive radio signal to the second radio circuit 610 via the second filter circuit 614 and the sixth terminal 611. The second antenna circuit 618 may provide the second receive signal concurrent with the first antenna circuit 616 providing the first receive signal.

Figure 7:
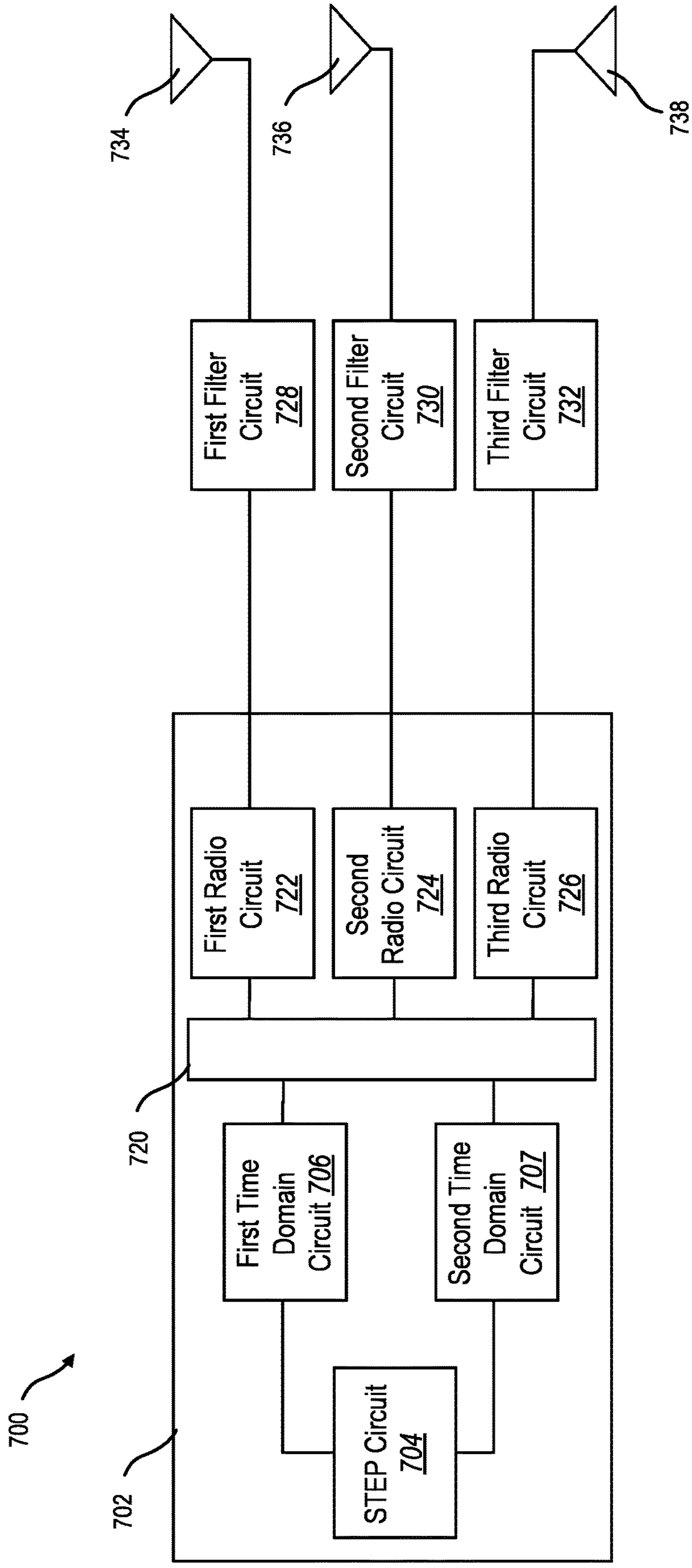
FIG. 7 shows a block diagram of another example multi-radio device.

FIG. 7 illustrates a block diagram of another example multi-radio device 700. The multi-radio device 700 may be the same as or similar to communication device 100, described above in relation to FIG. 1B. The multi-radio device 700 may include radiohead circuitry 702, a first filter circuit 728, a second filter circuit 730, a third filter circuit 732, a first antenna circuit 734, a second antenna circuit 736, and a third antenna circuit 738. The radiohead circuitry 702 may be the same as or similar to other radiohead circuitries described in the present disclosure (e.g., distributed radiohead unit 20). The first antenna circuit 734, the second antenna circuit 736, and the third antenna circuit 738 may be the same as or similar to other antenna circuits described in the present disclosure (e.g., antenna circuit 25).

The radiohead circuitry 702 may include a STEP circuit 704, a first time domain circuit 706, a second time domain circuit 707, a splitter/combiner circuit 720, a first radio circuit 722, a second radio circuit 724, and a third radio circuit 726. The STEP circuit 704 may be electrically coupled to the first time domain circuit 706 and the second time domain circuit 707. The first time domain circuit 706 and the second time domain circuit 707 may be electrically coupled to the splitter/combiner 720. The splitter/combiner 720 may be electrically coupled to the first radio circuit 722, the second radio circuit 724, and the third radio circuit 726.

The first filter circuit 728 may be electrically coupled between the first radio circuit 722 and the first antenna circuit 734. The second filter circuit 730 may be electrically coupled between the second radio circuit 724 and the second antenna circuit 736. The third filter circuit 732 may be electrically coupled between the third radio circuit 726 and the third antenna 738.

The STEP circuit 704 may include a serial interface that is communicatively coupled to additional electronic devices (e.g., a SOC) (not illustrated in FIG. 7). For example, the STEP circuit 704 may be communicatively coupled to a Wi-Fi DSP of the SOC. The STEP circuit 704 may generate a first STEP signal and a second STEP signal. The STEP circuit 704 may receive signals from the SOC in a first time domain, a second time domain, or some combination thereof. The STEP circuit 704 may generate the first STEP signal and the second STEP signal in the first time domain, the second time domain, or some combination thereof. The first time domain circuit 706 may generate a first time domain signal based on the first STEP signal. The first time domain circuit 706 may generate the first time domain signal by manipulating the first STEP signal in the corresponding time domain. The second time domain circuit 707 may generate a second time domain signal based on the second STEP signal. The second time domain circuit 707 may generate the second time domain signal by manipulating the second STEP signal in the corresponding time domain. The crossbar/switch 720 may route the first time domain signal, the second time domain signal, or some combination thereof to the first radio circuit 722, the second radio circuit 724, the third radio circuit 726, or some combination thereof.

The first radio circuit 608 may provide a first radio signal within a first frequency range based on the first time domain signal, the second time domain signal, or some combination thereof. In addition, the second radio circuit 610 may provide a second radio signal within a second frequency range based on the first time domain signal, the second time domain signal, or some combination thereof. The third radio circuit 726 may provide a third radio signal within a third frequency range based on the first time domain signal, the second time domain signal, or some combination thereof. The first frequency range, the second frequency range, and the third frequency range may each include different frequency ranges.

The first filter circuit 728 may receive and filter out portions of the first radio signal that are outside the first frequency range. The second filter circuit 730 may receive and filter out portions of the second radio signal that are outside the second frequency range. The third filter circuit 732 may receive and filter out portions of the third radio signal that are outside of the third frequency range.

The first antenna circuit 734 may receive the first radio signal. In addition, the first antenna circuit 734 may transmit a first wireless signal within the first frequency range representative of the first radio signal. The second antenna circuit 736 may receive the second radio signal. The second antenna circuit 736 may transmit a second wireless signal within the second frequency range representative of the second radio signal. The second antenna circuit 730 may transmit the second wireless signal concurrent with the first antenna circuit 734 transmitting the first wireless signal.

The third antenna circuit 738 may receive the third radio signal. In addition, the third antenna circuit 738 may transmit a third wireless signal within the third frequency range representative of the third radio signal. The third antenna circuit 738 may transmit the third wireless signal concurrent with the first antenna circuit 734 transmitting the first wireless signal, the second antenna circuit 736 transmitting the second wireless signal, or some combination thereof.

The first antenna circuit 734 may provide a first receive radio signal within the first frequency range to the first radio circuit 722 via the first filter circuit 728. The second antenna circuit 736 may provide a second receive radio signal within the second frequency range to the second radio circuit 724 via the second filter circuit 730. The second antenna circuit 736 may provide the second receive signal concurrent with the first antenna circuit 734 providing the first receive signal. The third antenna circuit 738 may provide a third receive radio signal within the third frequency range to the third radio circuit 726 via the third filter circuit 732. The third antenna circuit 738 may provide the third receive signal concurrent with the first antenna circuit 734 providing the first receive signal, the second antenna circuit 736 providing the second receive signal, or some combination thereof.

Figure 8:
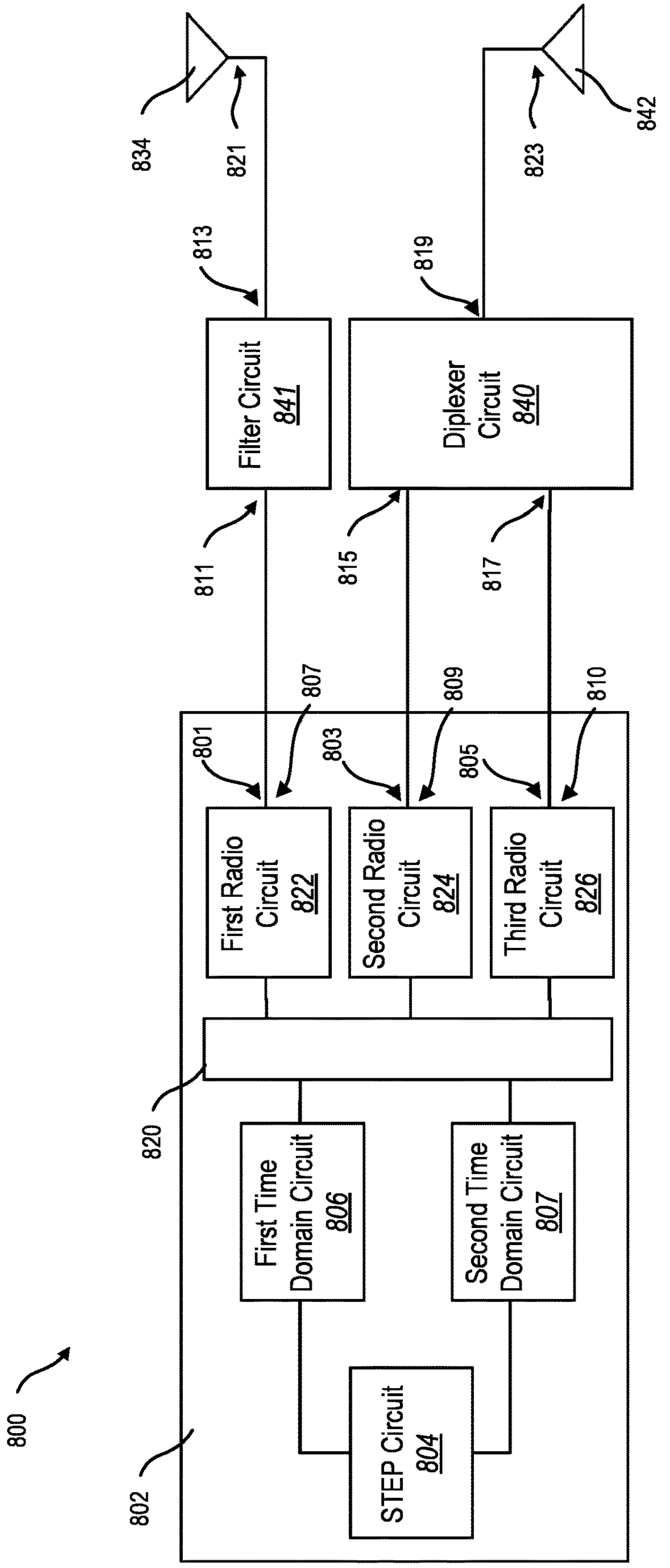
FIG. 8 shows a block diagram of yet another example multi-radio.

FIG. 8 illustrates a block diagram of yet another example multi-radio device 800. The multi-radio device 800 may be the same as or similar to communication device 100, described above in relation to FIG. 1B. The multi-radio device 800 may include the radiohead circuitry 702, a filter circuit 841, a diplexer circuit 840, a first antenna circuit 834, a second antenna circuit 842, or some combination thereof.

The first radio circuit 722 may include a first terminal 801 and a sixth terminal 807. The second radio circuit 724 may include a second terminal 803 and a seventh terminal 809. The third radio circuit may include a third terminal 805 and an eighth terminal 810. The first antenna circuit 834 may include a fourth terminal 821 and the second antenna circuit 842 may include a fifth terminal 823. The filter circuit 841 may include a ninth terminal 811 and a tenth terminal 813. The diplexer circuit 840 may include an eleventh terminal 815, a twelfth terminal 817, and a thirteenth terminal 819.

The first terminal 801 may be electrically coupled to the ninth terminal 811. In addition, the sixth terminal 807 may be electrically coupled to the ninth terminal 811. The second terminal 803 may be electrically coupled to the eleventh terminal 815. In addition, the seventh terminal 809 may be electrically coupled to the eleventh terminal 815. The third terminal 805 may be electrically coupled to the twelfth terminal 817. In addition, the eighth terminal 810 may be electrically coupled to the twelfth terminal 817. The tenth terminal 813 may be electrically coupled to the fourth terminal 821. The thirteenth terminal 819 may be electrically coupled to the fifth terminal 823.

The filter circuit 841 may receive and filter out portions of the first radio signal that are outside the first frequency range. The diplexer circuit 840 may receive and multiplex the second radio signal and the third radio signal. For example, the diplexer circuit 840 may multiplex the second radio signal and the third radio signal on to the thirteenth terminal 819. The diplexer circuit 840 may generate a multiplex radio signal representative of the second radio signal, the third radio signal, or some combination thereof. The diplexer circuit 840 may generate the multiplex radio signal within the second frequency range or the third frequency range based on whether the multiplex radio signal is representative of the second radio signal or the third radio signal.

The first antenna circuit 834 may receive the first radio signal. In addition, the first antenna circuit 834 may transmit a first wireless signal within the first frequency range representative of the first radio signal. The second antenna circuit 842 may receive the multiplex radio signal. In addition, the second antenna circuit 842 may transmit a second wireless signal representative of the multiplex radio signal. The second antenna circuit 842 may transmit the second wireless signal concurrent with the first antenna circuit 834 transmitting the first wireless signal. The second antenna circuit 842 may transmit the second wireless signal within the second frequency range if the multiplex radio signal is representative of the second radio signal. Alternatively, the second antenna circuit 842 may transmit the second wireless signal within the third frequency range if the multiplex radio signal is representative of the third radio signal.

The first antenna circuit 834 may provide a first receive radio signal within the first frequency range to the first radio circuit 722 via the fifth terminal 821. The second antenna circuit 842 may provide a second receive radio signal within the second frequency range or the third frequency range to the second radio circuit 724 or the third radio circuit 726 via the fifth terminal 823 and the diplexer circuit 840. In addition, the second antenna circuit 842 may provide the second receive radio signal to the third radio circuit 726 via the fifth terminal 823 and the diplexer circuit 840. The second antenna circuit 842 may provide the second receive signal concurrent with the first antenna circuit 834 providing the first receive signal.

Figure 9:
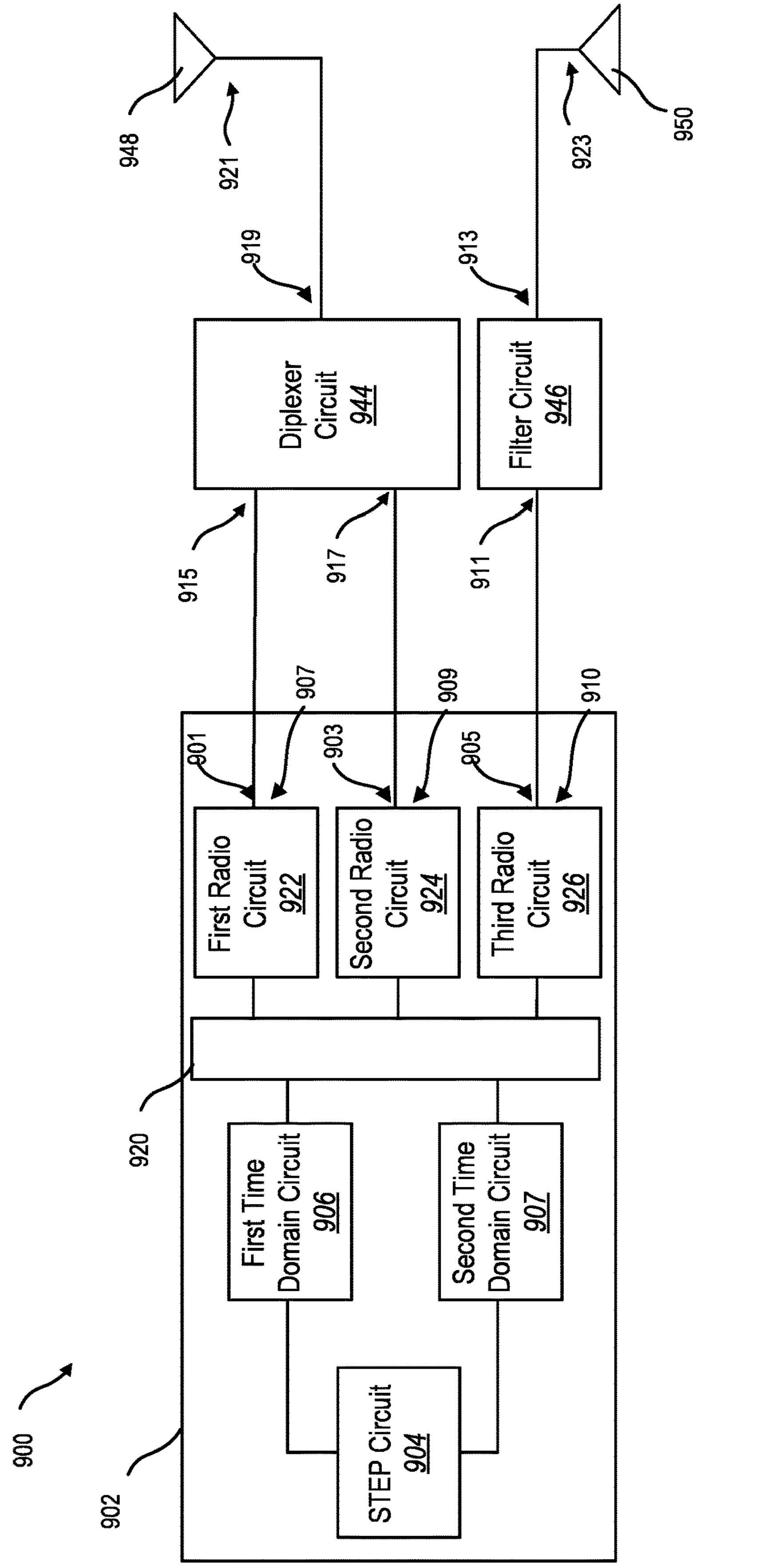
FIG. 9 shows a block diagram of an example multi-radio.

FIG. 9 illustrates a block diagram of an example multi-radio device 900, The multi-radio device 900 may be the same as or similar to communication device 100, described above in relation to FIG. 1B. The multi-radio device 900 may include the Radiohead circuitry 702, a filter circuit 946, a diplexer circuit 944, a first antenna circuit 948, a second antenna circuit 950, or some combination thereof.

The first antenna circuit 948 may include a fourth terminal 921 and the second antenna circuit 950 may include a fifth terminal 923. The filter circuit 946 may include a ninth terminal 911 and a tenth terminal 913. The diplexer circuit 944 may include an eleventh terminal 915, a twelfth terminal 917, and a thirteenth terminal 919.

The first terminal 801 may be electrically coupled to the eleventh terminal 915. In addition, the sixth terminal 807 may be electrically coupled to the eleventh terminal 915. The second terminal 803 may be electrically coupled to the twelfth terminal 917. In addition, the seventh terminal 809 may be electrically coupled to the twelfth terminal 917. The third terminal 805 may be electrically coupled to the ninth terminal 911. In addition, the eighth terminal 810 may be electrically coupled to the ninth terminal 911. The tenth terminal 913 may be electrically coupled to the fifth terminal 923. The thirteenth terminal 919 may be electrically coupled to the fourth terminal 921.

The diplexer circuit 944 may receive and multiplex the first radio signal and the second radio signal. For example, the diplexer circuit 944 may multiplex the first radio signal and the second radio signal on to the thirteenth terminal 919. The diplexer circuit 944 may generate a multiplex radio signal representative of the first radio signal, the second radio signal, or some combination thereof. The diplexer circuit 944 may generate the multiplex radio signal within the first frequency range or the second frequency range based on whether the multiplex radio signal is representative of the first radio signal or the second radio signal. The filter circuit 946 may receive and filter out portions of the third radio signal that are outside the third frequency range.

The first antenna circuit 948 may receive the multiplex radio signal. In addition, the first antenna circuit 948 may transmit a first wireless signal representative of the multiplex radio signal. The first antenna circuit 948 may transmit the first wireless signal within the first frequency range if the multiplex radio signal is representative of the first radio signal. Alternatively, the first antenna circuit 948 may transmit the first wireless signal within the second frequency range if the multiplex radio signal is representative of the second radio signal. The second antenna circuit 950 may receive the third radio signal. In addition, the second antenna circuit 950 may transmit a second wireless signal within the third frequency range representative of the third radio signal. The second antenna circuit 950 may transmit the second wireless signal concurrent with the first antenna circuit 948 transmitting the first wireless signal.

The first antenna circuit 948 may provide a first receive radio signal within the first frequency range or the second frequency range to the first radio circuit 722 or the second radio circuit 724 via the fourth terminal 921 and the diplexer circuit 944. The second antenna circuit 950 may provide a second receive radio signal within the third frequency range to the third radio circuit 726 via the fifth terminal 923 and the filter circuit 946. The second antenna circuit 950 may provide the second receive signal concurrent with the first antenna circuit 948 providing the first receive signal.

The present disclosure leverages Wi-Fi/Bluetooth DRS (Distributed Radio System) architecture to share single antenna for WWAN and Wi-Fi/Bluetooth communication. DRS enables locating the Wi-Fi/Bluetooth radiohead in close proximity, for example between 4 mm and 40 mm, to the shared antenna with separate RF traces for 2.4 GHz and 5-7 GHz bands.

The multi-radio wireless communication device may connect the 5-7 GHz Wi-Fi/Bluetooth bands and WWAN supporting multiple frequency bands up to 4.99 GHz (n79) through a diplexer to a single shared antenna. The multi-radio wireless communication device may also co-locate a 2.4 GHz antenna with a separate feed for the Wi-Fi/Bluetooth 2.4 GHz band and connect it through a filter to that antenna feed.

Sharing a single antenna may reduce the number of antennas required to support WWAN and Wi-Fi/Bluetooth in a multi-radio wireless communication device. For example, a personal computer (PC) may go from requiring six separate antennas to only four separate antennas, where two of the four antennas are shared between WWAN and Wi-Fi/Bluetooth communication.

The reduction in the number of antennas may reduce the space required for a DRS and allow a multi-radio wireless communication device more flexibility in their industrial design and antenna placement. Additionally, the shared antenna between WWAN and Wi-Fi/Bluetooth communication may enable Wi-Fi/Bluetooth communication through more than two antennas with no increase in device size. Sharing a multi-feed antenna between WWAN and Wi-Fi/Bluetooth communication may allow the separate WWAN and Wi-Fi/Bluetooth modules to maintain regulatory certification. The WWAN module design may remain unchanged and both the WWAN and the Wi-Fi/Bluetooth radiohead modules may support modular regulatory certification.

Figure 10:
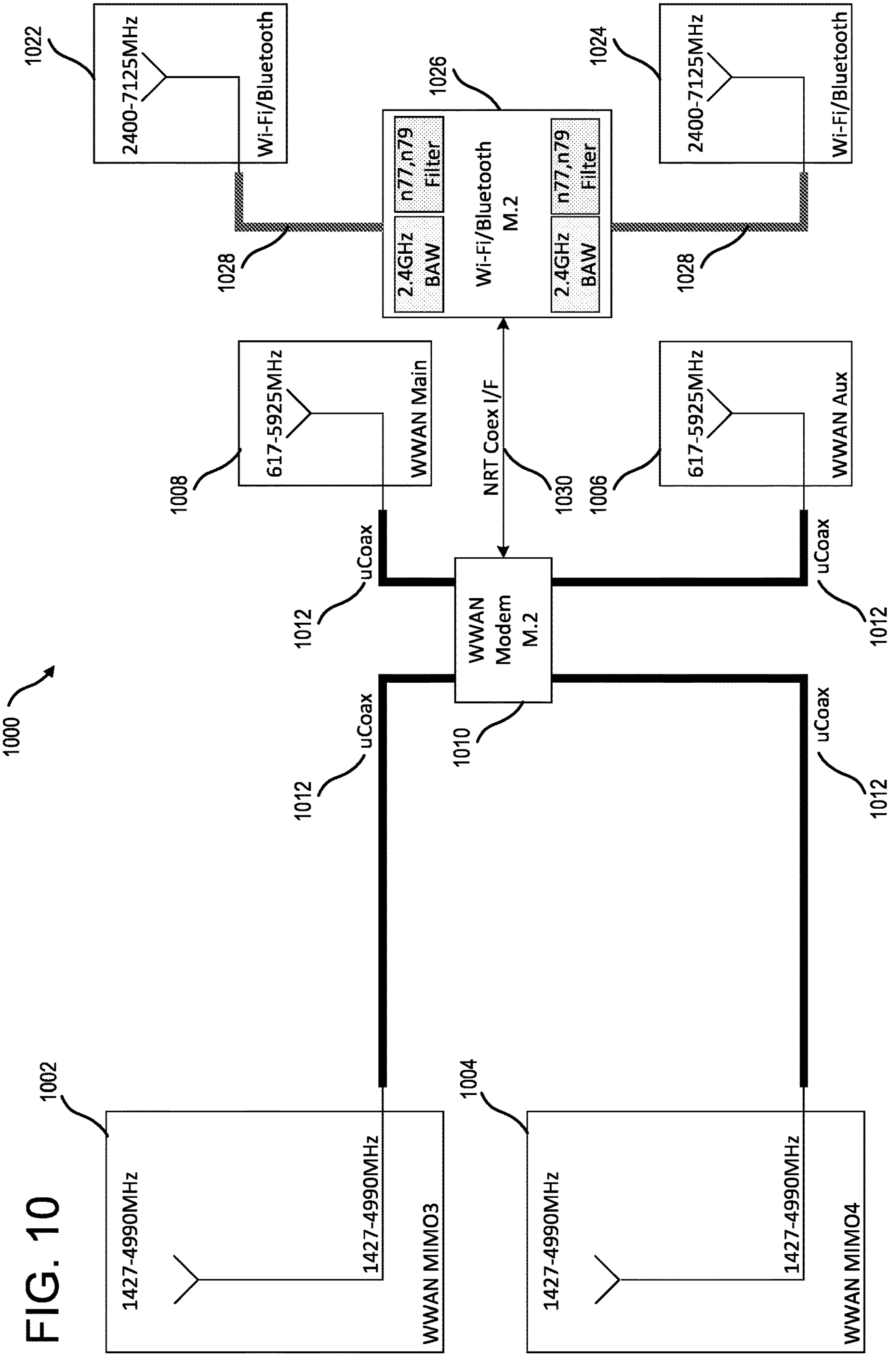
FIG. 10 shows a block diagram of an exemplary antenna configuration of a multi-radio wireless communication device.

FIG. 10 shows a block diagram of an exemplary antenna configuration 1000 of a multi-radio wireless communication device. For example, wireless communication device 100 of FIG. 1B. Antennas 1002, 1004, 1006, and 1008 may be designated for a first RAT only. For example, WWAN communication only and may be connected to WWAN module 1010 through coaxial cables 1012. Antennas 1022 and 1024 may be designated for a second RAT only. For example, Wi-Fi and/or Bluetooth communication only and be connected to Wi-Fi/Bluetooth module 1026 through coaxial cables 1028. Additionally, WWAN module 1010 and Wi-Fi module 1026 may be connected through non-real-time (NRT) coexistence interface 1030.

FIG. 11 shows an exemplary table 1100 of WWAN frequency bands of a first RAT in a wireless communication device. Four WWAN antennas of a multi-radio wireless communication device may be configured for different frequency bands. For example, antennas 1002, 1004, 1006, and 1008 of FIG. 10. The frequencies of table 1100 may correspond to antennas of a wireless communication device and there may be some overlap of frequency bands between different antennas as shown in Table 1100. For example, antennas 1002, 1004, 1006, and 1008 may correspond to columns 1102, 1104, 1106, and 1108 of table 1100.

Figure 12:
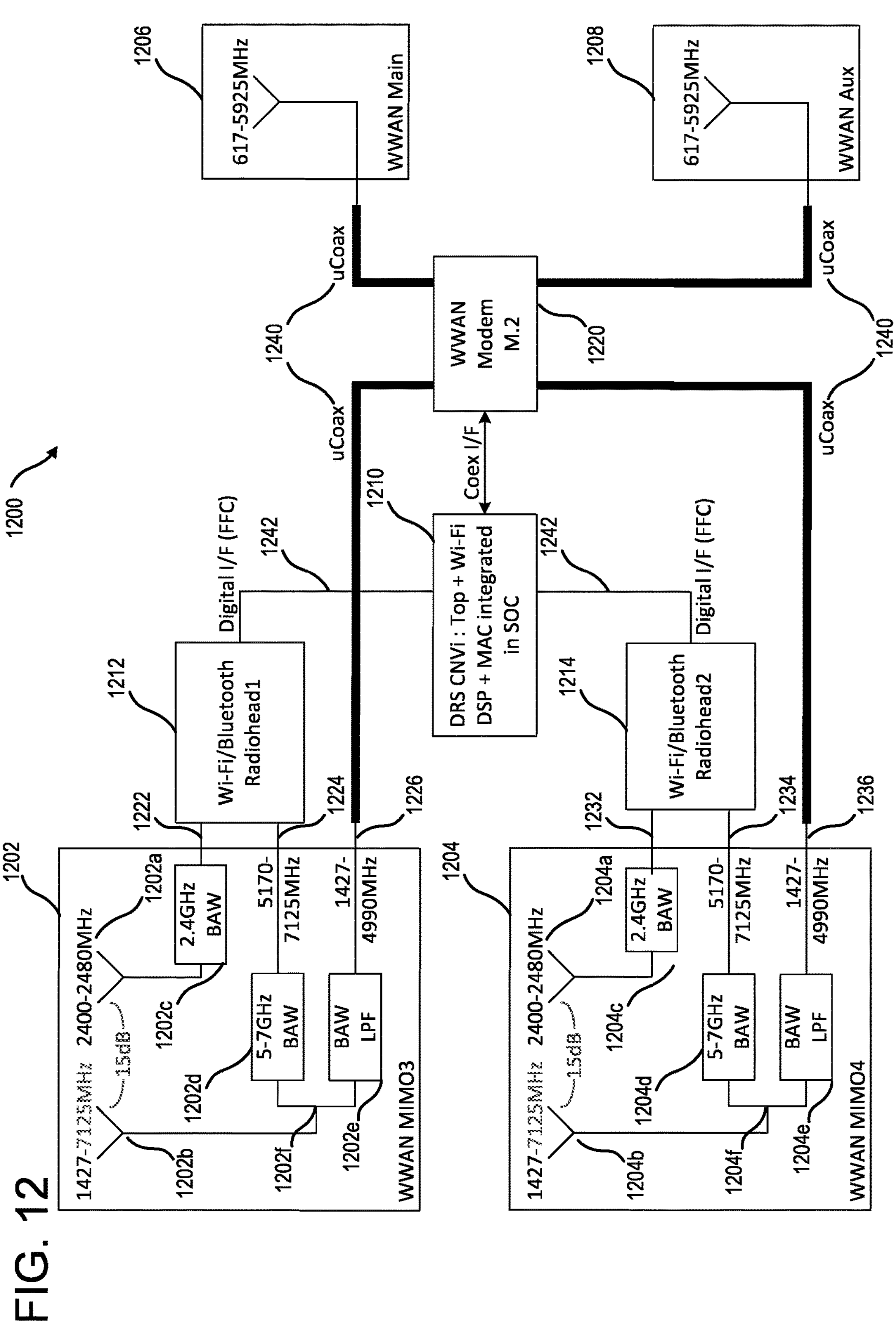
FIG. 12 shows a block diagram of an exemplary antenna sharing configuration of a multi-radio wireless communication device.

FIG. 12 shows a block diagram of an exemplary antenna sharing configuration 1200 of a multi-radio wireless communication device. For example, wireless communication device 100 of FIG. 1B. Combined antennas 1202 and 1204 may be configured with multiple antenna feeds connected to multiple antennas. For example, combined antenna 1202 may include a first antenna 1202*a* and a second antenna 1202*b* and combined antenna 1204 may include a first antenna 1204*a* and a second antenna 1204*b*.

Wi-Fi/Bluetooth module 1210 may be connected to Wi-Fi/Bluetooth radioheads 1212 and 1214 of combined antennas 1202 and 1204 through digital interfaces 1242. Radiohead 1212 may be connected to and/or co-located with antenna feed 1222 of antenna 1202*a* and antenna feed 1224 of antenna 1202*b* of combined antenna 1202. Antenna feed 1222 may be configured for Wi-Fi and Bluetooth communication at the 2.4 GHz band. The connection between radiohead 1212 and antenna feed 1222 may include Bulk Acoustic Wave (BAW) filter 1202*c*. Antenna feed 1224 may be configured for Wi-Fi and Bluetooth communication at the 5-7 GHz band. The connection between radiohead 1212 and antenna feed 1224 may include Bulk Acoustic Wave (BAW) filter 1202*d*.

WWAN module 1220 may be connected to antenna feed 1226 of combined antenna 1202 through coaxial cables 1240. Antenna feed 1226 of antenna 1202*b* may include low pass filter (LPF) 1202*e*. Antenna 1202 may also include diplexer 1202*f* which may multiplex a signal from antenna feed 1224 and antenna feed 1226.

Similarly, radiohead 1214 may be connected to and/or co-located with antenna feed 1232 of antenna 1204*a* and antenna feed 1234 of antenna 1204*b* of combined antenna 1204. Antenna feed 1232 may be configured for Wi-Fi and Bluetooth communication at the 2.4 GHz band. The connection between radiohead 1214 and antenna feed 1232 may include Bulk Acoustic Wave (BAW) filter 1204*c*. Antenna feed 1234 may be configured for Wi-Fi and Bluetooth communication at the 5-7 GHz band. The connection between radiohead 1214 and antenna feed 1234 may include Bulk Acoustic Wave (BAW) filter 1204*d*.

WWAN module 1220 may be connected to antenna feed 1236 of combined antenna 1204 through coaxial cables 1240. Antenna feed 1236 of antenna 1204*b* may include low pass filter (LPF) 1204*e*. Antenna 1204 may also include diplexer 1204*f* which may multiplex a signal from antenna feed 1234 and antenna feed 1236.

WWAN modem 1220 may also be connect to antennas 1206 and 1208 through coaxial cables 1240. Antennas 1206 and 1208 may be dedicated for WWAN communication Antenna. Furthermore WWAN modem 1220 and Wi-Fi module 1210 may interface through a coexistence interface.

Diplexers 1202*f* and 1204*f* may diplex the 5150-7125 MHz Wi-F/Bluetooth frequency bands from radioheads 1212 and 1214 with the 1427-4990 MHz WWAN frequency bands from the WWAN module. As a result, both Wi-Fi/Bluetooth and WWAN signals can share one antenna. For example, antennas 1202*b* and 1204*b* may each transmit both Wi-Fi/Bluetooth and WWAN signals can share a single antenna.

The diplexer can be implemented as a combination of a LPF with a cutoff frequency of 4990 MHz, which will support all the relevant WWAN frequency bands in MIMO3/MIMO4 antennas, and a 5-7 GHz bandpass filter (BPF), which will support Wi-Fi 5 GHz and 6 GHz frequency bands. These filters can be implemented using BAW technology to achieve sufficient isolation between two antennas of combined antennas 1202 and 1204 and enable concurrent or simultaneous operation of WWAN and Wi-Fi/Bluetooth communication in the corresponding bands.

Antennas 1202 and 1204 may include a separate antenna feed for 2.4 GHz and connect Wi-Fi/Bluetooth 2.4 GHz frequency bands from the Wi-Fi/Bluetooth radiohead through a bandpass filter to that antenna feed. The 2.4 GHz bandpass filter can be implemented using BAW technology. Filter rejection in combination with sufficient isolation between the 2.4 GHz and the 1427-7125 MHz antennas enables concurrent operation of Wi-Fi/Bluetooth and WWAN in all corresponding bands.

The WWAN module 1220 may be configured to comply with modular regulatory certification requirements. The antenna with the lowpass filter complies with the definition of a passive antenna, if meeting the voltage standing wave ratio (VSWR) and gain requirements as specified to fit module antenna specifications, it complies with regulatory certification requirements. The antenna may be configured to maintain a gain of less than +2 dBi in a spurious domain including a lowpass filter.

Similarly, the Wi-Fi/Bluetooth Radiohead module may be configured to comply with regulatory modular certification requirements. Adding the 2.4 GHz and the 5-7 GHz bandpass filters to the passive antenna would allow regulatory modular certification if the antenna with passive filters is meeting the requirements as defined for the module the antenna specifications.

It should be noted that other antenna sharing configurations are possible using similar configurations. For example, sharing WWAN Diversity and MIMO4 antennas with a Wi-Fi/Bluetooth radiohead module.

The shared antenna configuration shares WWAN antennas that are configured for reception (Rx) or downlink (DL) only with Wi-Fi/Bluetooth communication. Therefore, there should be no impact on Wi-Fi/Bluetooth Rx sensitivity due to WWAN transmission (Tx).

On the other hand, the WWAN Diversity antenna supports up to 5925 MHz. Therefore, concurrent Tx in Wi-Fi 5-7 GHz band and Rx in WWAN bands 46 and/or band47 license assisted access (LAA) is not allowed. Rx/Rx concurrency can still be supported, through Real-Time coexistence interface between WWAN and Wi-Fi.

Figure 13:
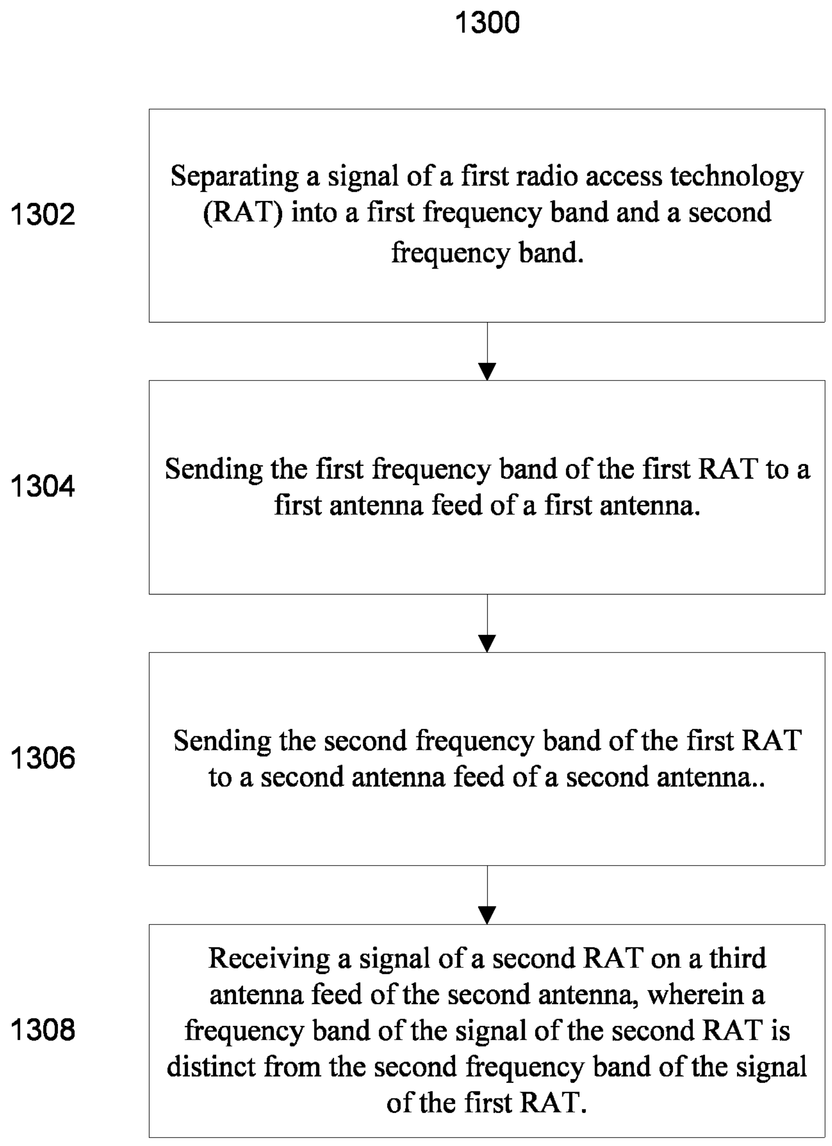
FIG. 13 shows a block diagram of a method to share a single antenna between different frequency bands of different RATs.

FIG. 13. Illustrates an exemplary method 1300 of sharing antennas. As shown in FIG. 13, method 1300 includes separating a signal of a first radio access technology (RAT) into a first frequency band and a second frequency band (stage 1302), sending the first frequency band of the first RAT to a first antenna feed of a first antenna (stage 1304), sending the second frequency band of the first RAT to a second antenna feed of a second antenna (stage 1306), and receiving and/or transmitting a signal of a second RAT on a third antenna feed of the second antenna, wherein a frequency band of the signal of the second RAT is distinct from the second frequency band of the first RAT (stage 1308).

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

In the following examples disclose various aspects of this disclosure:

In Example 1, a combined antenna circuitry including a multi-feed antenna including a first antenna feed, a second antenna feed, and a third antenna feed; wherein the first antenna feed is connected to a first antenna of the combined antenna circuitry and is configured for a first frequency band of a first radio access technology (RAT); wherein the second antenna feed is connected to a second antenna of the combined antenna circuitry and is configured for a second frequency band of the first RAT; and wherein the third antenna feed is connected to the second antenna of the combined antenna circuitry and is configured for a frequency band of a second RAT, wherein the frequency band of the second RAT is distinct from the second frequency band of the first RAT.

In Example 2, a multi-radio circuitry including a radiohead configured for a first radio access technology (RAT) configured to separate a signal of the first RAT into a first frequency band of the first RAT and a second frequency band of the first RAT; a first antenna feed, a second antenna feed, and a third antenna feed; wherein the first antenna feed is connected to a first antenna of a combined antenna circuitry and is configured for the first frequency band of the first RAT; wherein the second antenna feed is connected to a second antenna of the combined antenna circuitry and is configured for the second frequency band of the first RAT; and wherein the third antenna feed is connected to the second antenna of the combined antenna circuitry and is configured for a frequency band of a second RAT, wherein the frequency band of the second RAT is distinct from the second frequency band of the first RAT.

In Example 3, a multi-radio circuitry including a radiohead configured for a first radio access technology (RAT) configured to separate a signal of the first RAT into a first frequency band of the first RAT and a second frequency band of the first RAT; a first antenna feed, a second antenna feed, and a third antenna feed; wherein the first antenna feed is connected to a first antenna of a combined antenna circuitry and is configured for the first frequency band of the first RAT; wherein the second antenna feed is connected to a second antenna of the combined antenna circuitry and is configured for the second frequency band of the first RAT; and wherein the third antenna feed is connected to the second antenna of the combined antenna circuitry and is configured for a frequency band of a signal of a second RAT, wherein the frequency band of the second RAT is distinct from the second frequency band of the first RAT; a diplexer configured to multiplex the signal of the second RAT and the second frequency band of the signal of first RAT.

In Example 4, the subject matter of any one of Examples 1 to 3, may optionally further include, wherein the first RAT is wireless fidelity (Wi-Fi).

In Example 5, the subject matter of any one of Examples 1 to 4, may optionally further include, wherein the first RAT is Bluetooth.

In Example 6, the subject matter of any one of Examples 1 to 5, may optionally further include, wherein the second RAT is wireless wide area network (WWAN).

In Example 7, the subject matter of any one of Examples 1 to 6, may optionally further include, wherein the first frequency band of the first RAT is 2400-2480 MHz.

In Example 8, the subject matter of any one of Examples 1 to 7, may optionally further include, wherein the second frequency band of the first RAT is 5150-7125 MHz.

In Example 9, the subject matter of any one of Examples 1 to 8, may optionally further include, wherein the frequency band of the second RAT is 1427-4990 MHz.

In Example 10, the subject matter of any one of Examples 1 to 9, may optionally further include, wherein the diplexer is configured to receive to receive the second frequency band of the first RAT and the frequency band of the second RAT.

In Example 11, the subject matter of any one of Examples 1 to 10, may optionally further include, wherein the diplexer is a combination of a low pass filter (LPF) and a bandpass filter (BPF).

In Example 12, the subject matter of any one of Examples 1 to 11, may optionally further include, wherein the LPF includes a cutoff frequency.

In Example 13, the subject matter of any one of Examples 1 to 12, may optionally further include, wherein the cutoff frequency is 4990 MHz.

In Example 14, the subject matter of any one of Examples 1 to 13, may optionally further include, wherein the BPF is configured for 5-7 GHz.

In Example 15, the subject matter of any one of Examples 1 to 14, may optionally further include, wherein the second antenna feed is connected to a radiohead, and the third antenna feed is connected to a modem of the second RAT.

In Example 16, the subject matter of any one of Examples 1 to 15, may optionally further include, wherein the radiohead is further connected to a modem of the first RAT.

In Example 17, the subject matter of any one of Examples 1 to 16, may optionally further include, wherein the third antenna feed is connected to a modem of the second RAT via a coaxial cable.

In Example 18, the subject matter of any one of Examples 1 to 17, may optionally further include a bulk acoustic wave (BAW) filter, wherein the BAW filter is configured to isolate between the first antenna and the second antenna.

In Example 19, the subject matter of any one of Examples 1 to 18, may optionally further include, wherein the first antenna feed is connected to the radiohead.

In Example 20, the subject matter of any one of Examples 1 to 19, may optionally further include, wherein the first antenna feed includes a bandpass filter (BPF).

In Example 21, the subject matter of any one of Examples 1 to 20, may optionally further include, wherein the BPF is configured for the 2.4 GHz frequency band.

In Example 22, the subject matter of any one of Examples 1 to 21, may optionally further include, wherein a location of the first antenna with respect to a location of the second antenna are configured for an isolation between the first antenna and the second antenna, wherein the isolation reduces interference between the first and second antennas.

In Example 23, the subject matter of any one of Examples 1 to 22, may optionally further include, wherein the isolation is of 15 dB or more between the first antenna and the second antenna.

In Example 24, the subject matter of any one of Examples 1 to 23, may optionally further include, wherein the first antenna is configured to transmit a signal of the first RAT at the first frequency.

In Example 25, the subject matter of any one of Examples 1 to 24, may optionally further include, wherein the second antenna is configured to simultaneously transmit a signal of the second RAT and a signal of the first RAT at the second frequency.

In Example 26, the subject matter of any one of Examples 1 to 25, may optionally further include, wherein the second antenna is configured to concurrently transmit a signal of the second RAT and a signal of the first RAT at the second frequency.

In Example 27, a method including separating a signal of a first radio access technology (RAT) into a first frequency band and a second frequency band; sending the first frequency band of the signal of a first RAT to a first antenna feed of a first antenna; receiving a signal of a second RAT; sending the second frequency band of the signal of the first RAT and the signal of the second RAT to a second antenna; and multiplexing the second frequency band of the signal of the first RAT and the signal of the second.

In Example 28, the subject matter of Examples 27, may optionally further include, wherein the first RAT is wireless fidelity (Wi-Fi).

In Example 29, the subject matter of any one of Examples 27 or 28, may optionally further include, wherein the first RAT is Bluetooth.

In Example 30, the subject matter of any one of Examples 27 to 29, may optionally further include, wherein the second RAT is wireless wide area network (WWAN).

In Example 31, the subject matter of any one of Examples 27 to 30, may optionally further include, wherein the first frequency band of the first RAT is 2400-2480 MHz.

In Example 32, the subject matter of any one of Examples 27 to 31, may optionally further include, wherein the second frequency band of the first RAT is 5150-7125 MHz.

In Example 33, the subject matter of any one of Examples 27 to 32, may optionally further include, wherein the frequency band of the second RAT is 1427-4990 MHz.

In Example 34, the subject matter of any one of Examples 27 to 33, may optionally further include, receiving the signal of the first RAT from a modem.

In Example 35, the subject matter of any one of Examples 27 to 34, may optionally further include, transmitting a signal of the first RAT at the first frequency on a first antenna.

In Example 36, the subject matter of any one of Examples 27 to 35, may optionally further include, simultaneously transmitting a signal of the second RAT and a signal of the first RAT at the second frequency on a second antenna.

In Example 37, the subject matter of any one of Examples 27 to 36, may optionally further include, concurrently transmitting a signal of the second RAT and a signal of the first RAT at the second frequency on a second antenna.

In Example 38, a system including one or more devices according to Examples 1 to 26 configured to implement a method according to Examples 27 to 37.

In Example 39, one or more non-transitory computer readable media including programmable instructions thereon, that when executed by one or more processors of a device, cause the device to perform any one of the method of Examples 27 to 37.

In Example 40, a means for implementing any of the Examples 1 to 26.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

The terms "group," "set", "sequence," and the like refer to a quantity equal to or greater than one.

Any term expressed in plural form that does not expressly state "plurality" or "multiple" similarly refers to a quantity equal to or greater than one.

The term "lesser subset" refers to a subset of a set that contains less than all elements of the set.

Any vector and/or matrix notation utilized herein is exemplary in nature and is employed for purposes of explanation. This disclosure described with vector and/or matrix notation are not limited to being implemented with vectors and/or matrices and the associated processes and computations may be performed in an equivalent manner with sets or sequences of data or other information.

The words "exemplary" and "demonstrative" are used herein to mean "serving as an example, instance, demonstration, or illustration". Any embodiment or design described herein as "exemplary" or "demonstrative" is not necessarily to be construed as preferred or advantageous over other embodiments or designs.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The phrases "at least one" and "one or more" may be understood to include a numerical quantity greater than or equal to one, e.g., one, two, three, four, [ . . . ], etc. The phrase "at least one of with regard to a group of elements may be used herein to mean at least one element from the group consisting of the elements. For example, the phrase "at least one of with regard to a group of elements may be used herein to mean one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and/or may represent any information as understood in the art.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), gNodeBs, Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. The circuitry may be implemented in, or functions associated with the circuitry may be implemented by, one or more software or firmware modules. Circuitry may include logic, at least partially operable in hardware.

The terms "communicate" and "communicating" as used herein with respect to a signal includes transmitting the signal and/or receiving the signal. For example, an apparatus, which is capable of communicating a signal, may include a transmitter to transmit the signal, and/or a receiver to receive the signal. The verb communicating may be used to refer to the action of transmitting or the action of receiving. In one example, the phrase "communicating a signal" may refer to the action of transmitting the signal by a transmitter, and may not necessarily include the action of receiving the signal by a receiver. In another example, the phrase "communicating a signal" may refer to the action of receiving the signal by a receiver, and may not necessarily include the action of transmitting the signal by a transmitter.

The term "antenna", as used herein, may include any suitable configuration, structure and/or arrangement of one or more antenna elements, components, units, assemblies and/or arrays. The antenna may implement transmit and receive functionalities using separate transmit and receive antenna elements. The antenna may implement transmit and receive functionalities using common and/or integrated transmit/receive elements. The antenna may include, for example, a phased array antenna, a single element antenna, a set of switched beam antennas, and/or the like. In one example, an antenna may be implemented as a separate element or an integrated element, for example, as an on-module antenna, an on-chip antenna, or according to any other antenna architecture.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UNITS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LIE Extra, LTE-Advanced Pro, LTE Licensed-Assisted Access (LAA), MuLTEfire, UMTS Terrestrial Radio Access (UTRA), Evolved UNITS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Examples described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where e.g. the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Some examples may be used in conjunction with Radio Frequency (RF) systems, radar systems, vehicular radar systems, autonomous systems, robotic systems, detection systems, InfraRed (IR) systems, or the like. For example, with respect to systems, e.g., Light Detection Ranging (LiDAR) systems, and/or sonar systems, utilizing light and/or acoustic signals.

This disclosure may be used in conjunction with various devices and systems, for example, a radar sensor, a radar device, a radar system, a vehicle, a vehicular system, an autonomous vehicular system, a vehicular communication system, a vehicular device, an airborne platform, a waterborne platform, road infrastructure, sports-capture infrastructure, city monitoring infrastructure, static infrastructure platforms, indoor platforms, moving platforms, robot platforms, industrial platforms, a sensor device, a User Equipment (UE), a Mobile Device (MD), a wireless station (STA), a sensor device, a non-vehicular device, a mobile or portable device, and the like.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An antenna circuitry comprising:

a multi-feed antenna including a first antenna feed, a second antenna feed, and a third antenna feed;

wherein the first antenna feed is configured to be connected to a first antenna of the combined antenna circuitry and is configured to operate on a first frequency band of a signal of a first radio access technology (RAT);

wherein the second antenna feed is configured to be connected to a second antenna of the combined antenna circuitry and is configured to operate on a second frequency band of a signal of the first RAT; and wherein the third antenna feed is configured to be connected to the second antenna of the combined antenna circuitry and is configured to operate on a frequency band of a signal of a second RAT, wherein the frequency band of the signal of the second RAT is distinct from the second frequency band of the signal of the first RAT.

2. The antenna circuitry of claim 1, wherein the signal of the first RAT is wireless fidelity (Wi-Fi).

3. The antenna circuitry of claim 2, wherein the second frequency band of the signal of the first RAT is 5150-7125 MHz.

4. The antenna circuitry of claim 3, wherein the frequency band of the signal of the second RAT is 1427-4990 MHz.

5. The antenna circuitry of claim 1, wherein the signal of the second RAT is wireless wide area network (WWAN).

6. The antenna circuitry of claim 1 further comprising a diplexer, wherein the diplexer is configured to receive and/or transmit the second frequency band of the signal of the first RAT and the frequency band of the signal of the second RAT.

7. The antenna circuitry of claim 1, further comprising:

the first antenna of the combined antenna circuitry;

the second antenna of the combined antenna circuitry;

wherein the first feed is connected to the first antenna of the combined antenna circuitry;

wherein the second antenna feed is connected to the second antenna of the combined antenna circuitry; and wherein the third antenna feed is connected to the second antenna of the combined antenna circuitry.

8. The antenna circuitry of claim 7, wherein the LPF includes a cutoff frequency of 4990 MHz.

9. The antenna circuitry of claim 8, wherein the BPF is configured for 5-7 GHz.

10. The antenna circuitry of claim 1, wherein the second antenna feed is connected to a radiohead, and the third antenna feed is connected to a modem of the second RAT.

11. The antenna circuitry of claim 10, wherein the radiohead is further connected to a modem of the first RAT.

12. The antenna circuitry of claim 11, wherein the third antenna feed is connected to a modem of the second RAT via a coaxial cable.

13. The antenna circuitry of claim 12, further comprising a bandpass filter (BPF), wherein the BPF filter is configured to isolate between the first antenna and the second antenna.

14. The antenna circuitry of claim 10, wherein the first antenna feed is connected to the radiohead.

15. The antenna circuitry of claim 1, wherein each of the first antenna feed, the second antenna feed, and the third antenna feed are integrated on a chip.

16. The antenna circuitry of claim 1, further comprising the first antenna and the second antenna, and wherein each of the first antenna feed, the second antenna feed, the third antenna feed, the first antenna, and the second antenna are integrated on a chip.

17. A method comprising:

separating a signal of a first radio access technology (RAT) into a first frequency band and a second frequency band;

sending the first frequency band of the signal of the first RAT to a first antenna feed of a first antenna;

sending the second frequency band of the signal of the first RAT to a second antenna feed of a second antenna;

receiving a signal of a second RAT on a third antenna feed of the second antenna, wherein a frequency band of the signal of the second RAT is distinct from the second frequency band of the signal of the first RAT; and multiplexing the signal of the second RAT and the second frequency band of the signal of the first RAT.

18. The method of claim 17, further comprising transmitting the first frequency band of the signal of the first RAT on a first antenna.

19. The method of claim 18, further comprising simultaneously transmitting the signal of the second RAT and the second frequency band of the signal of the first RAT on a second antenna.

20. The method of claim 18, further comprising concurrently transmitting the signal of the second RAT and the second frequency band of the signal of the first RAT on a second antenna.

* * * * *